(12) United States Patent
Shimizu et al.

(10) Patent No.: US 9,019,445 B2
(45) Date of Patent: Apr. 28, 2015

(54) LIGHTING DEVICE, DISPLAY DEVICE, AND TELEVISION RECEIVER

(75) Inventors: Takaharu Shimizu, Osaka (JP); Mamoru Takaya, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 330 days.

(21) Appl. No.: 13/516,804

(22) PCT Filed: Nov. 17, 2010

(86) PCT No.: PCT/JP2010/070445
§ 371 (c)(1), (2), (4) Date: Jun. 18, 2012

(87) PCT Pub. No.: WO2011/077863
PCT Pub. Date: Jun. 30, 2011

(65) Prior Publication Data
US 2012/0257140 A1 Oct. 11, 2012

(30) Foreign Application Priority Data
Dec. 25, 2009 (JP) .................................. 2009-295151

(51) Int. Cl.
*G02F 1/1335* (2006.01)
*F21S 4/00* (2006.01)
(Continued)

(52) U.S. Cl.
CPC ........ G09G 3/3426 (2013.01); G02F 1/133603 (2013.01); *G02F 2001/133612* (2013.01); *G09G 2310/0232* (2013.01); *G09G 2320/0233* (2013.01); *G09G 2320/064* (2013.01)

(58) Field of Classification Search
CPC .............. G02F 1/133611; G02F 2001/133613
USPC ........ 349/58, 62, 65, 68; 362/249.02, 249.05, 362/249.06, 612
See application file for complete search history.

(56) References Cited

U.S. PATENT DOCUMENTS 7,717,601 B2 * 5/2010 Tan et al. ....................... 362/613
8,081,271 B2 * 12/2011 Kobayashi et al. ............. 349/64
(Continued)

FOREIGN PATENT DOCUMENTS

JP 2006-120644 A 5/2006
JP 2007-219234 A 8/2007
(Continued)

OTHER PUBLICATIONS

Official Communication issued in International Patent Application No. PCT/JP2010/070445, mailed on Feb. 1, 2011.

*Primary Examiner* — Paisley L Arendt
(74) *Attorney, Agent, or Firm* — Keating & Bennett, LLP

(57) ABSTRACT

Uneven brightness is less likely to occur in lighting devices at low cost. A backlight unit 12 includes LEDs 17, a chassis 14 having a bottom plate 14a and housing the LEDs 17, and an LED drive controller 24 controlling drive of the LEDs 17. The LEDs 17 are arranged in a matrix in row and column directions (X-axis direction and Y-axis direction) along the bottom plate 14a, forming respective LED groups 25 each along the row direction. The LED groups 25 include a middle LED group 28 and an end side LED group 29. The middle LED group 28 is located in a middle portion of the bottom plate 14a in the column direction group and the end side LED group 29 is located closer to an end of the bottom part from the middle portion group. The LED drive controller 24 controls light of at least one of the middle LED group 28 and the end side LED group 29 such that the end side LED group 29 has relatively high brightness and the middle LED group 28 has relatively low brightness.

26 Claims, 24 Drawing Sheets

(51) Int. Cl.
*F21V 21/00* (2006.01)
*G09G 3/34* (2006.01)

(56) References Cited

U.S. PATENT DOCUMENTS 8,421,362 B2 * 4/2013 Kato .......................... 315/169.3
8,550,646 B2 * 10/2013 Kwon et al. ................. 362/97.3

2006/0087827 A1 4/2006 Jung et al.
2007/0236446 A1 10/2007 Shin et al.
2008/0150884 A1 6/2008 Ito

FOREIGN PATENT DOCUMENTS

JP 2007-279698 A 10/2007
JP 2008-158449 A 7/2008

* cited by examiner

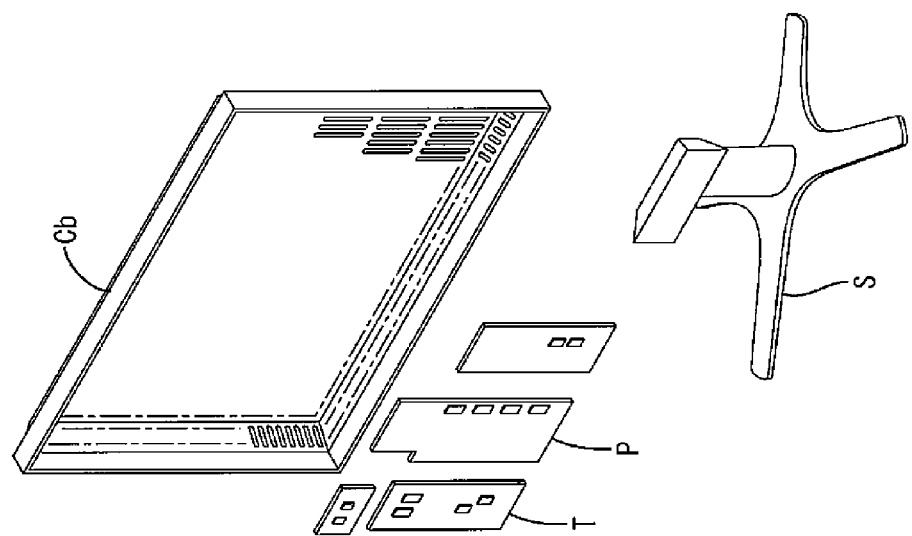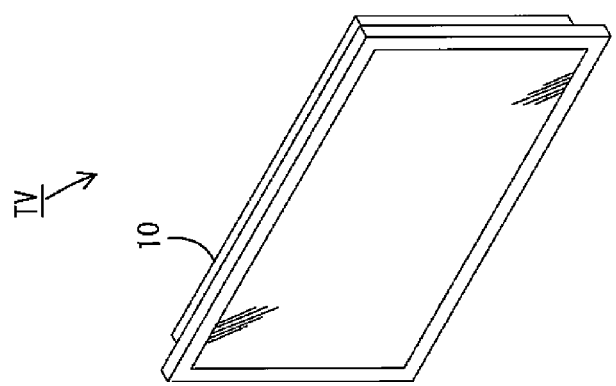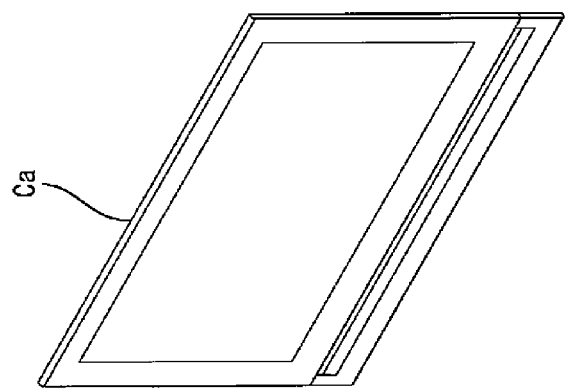
FIG.1

LIGHTING DEVICE, DISPLAY DEVICE, AND TELEVISION RECEIVER

TECHNICAL FIELD

The present invention relates to a lighting device, a display device, and a television receiver.

BACKGROUND ART

Liquid crystal panels used in liquid crystal display devices such as, for example, liquid crystal TVs, do not emit light themselves and require a backlight unit as an additional lighting device. The backlight unit is installed on the backside (opposite to the display surface) of the liquid crystal panel, and includes a chassis with an opening in the surface on the liquid crystal panel side, light sources housed in the chassis, a reflection sheet arranged along the inner surface of the chassis for reflecting light toward the opening of the chassis, and an optical member (such as a diffuser sheet) disposed at the opening of the chassis for directing the light emitted from the light sources efficiently toward the liquid crystal panel.

Some backlight units having the configuration described above use LEDs as the light sources for reducing power consumption, in which case, for example, a multiplicity of LEDs may be arrayed in a planar arrangement on a bottom plate of the chassis. One problem with such backlight units was that dark areas were created in four corners of the screen when observed from the front due to a shortage of light emitted from the backlight unit. The following Patent Document 1 describes a technique proposed to solve this problem.

Patent Document 1: Japanese Unexamined Patent Publication No. 2006-120644

Problem to be Solved by the Invention

Patent Document 1 listed above employs a configuration of LEDs arrayed in a planar arrangement on the bottom plate of the chassis, with more LEDs installed near the corners than in the central section. This allegedly compensates for the shortage of light in the corners by the larger number of LEDs emitting light near the corners.

The technique described in Patent Document 1 above, if employed, however, will have a problem of increased production cost due to the increased number of installed LEDs, as the backlight unit as a whole requires a larger number of LEDs to be installed. Moreover, to install LEDs in different numbers depending on the position inside the chassis, an LED board of a special design need to be fabricated because of the need to unevenly distribute the LEDs thereon. The inability to use general-purpose LED boards with equally spaced LEDs was the cause of making the production cost even higher.

Disclosure of the Present Invention

The present technology was made in view of the foregoing circumstances, its object being to reduce uneven brightness at low cost.

Means for Solving the Problem

The lighting device of the present technology includes a plurality of light sources, a chassis including a bottom part having a rectangular plan view shape and configured to house the light sources, and a light source drive controller configured to control drive of the light sources. The light sources are arranged in a matrix in row and column directions along the bottom part. The light sources that are arranged in the row direction configure a light source group and the light source group includes a plurality of light source groups arranged in the column direction. The light source groups include a middle light source group and an end side light source group and the middle light source group includes the light source groups arranged in a middle portion of the bottom part in the column direction and the end side light source group includes the light source groups arranged close to an end side in the column direction. The light source drive controller is configured to control light of at least one of the middle light source group and the end side light source group such that the end side light source group has relatively high brightness and the middle light source group has relatively low brightness.

In a configuration where a plurality of light sources is arranged in a matrix along the bottom part of the chassis, dark areas may be formed in corners of the bottom part where the light tends to be insufficient. One possible solution would be, for example, to arrange more light sources near the corners of the bottom part, which, however, leads to higher cost due to the increased number of light sources to be installed. In this regard, with the present technology, the light source drive controller driving the plurality of light sources controls light of at least one of the middle light source group and the end side light source group, which are formed by light source groups each formed by the plurality of light sources arranged along the row direction, such that the end light source group located closer to an end in the column direction of the bottom part has relatively high brightness and the middle light source group located in a middle portion of the bottom part has relatively low brightness. In this way, any shortage of light in an end section closer to the corners of the bottom part where light tends to be insufficient is compensated for by the end light source group having relatively high brightness, while the brightness of the middle light source group in the middle portion where there is sufficient light is made relatively low so as to reduce any inconsistency in brightness between the middle and end sections. Thus, the brightness of emitted light is made highly uniform in the surface of the bottom part without taking the approach that requires an increased number of light sources to be installed, thereby lowering the cost and reducing uneven brightness.

The following configurations are preferable as embodiments of the present invention.

(1) The end light source group may include at least one of the light source group that is located close to an outermost end of the bottom part in the column direction. The light source group located outermost in the column direction of the bottom part is one that is closest to a corner where light tends to be insufficient. In the present technology, as such light source group located closest to a corner is included in the end side light source group with relatively higher brightness than the middle light source group, a shortage of light likely to occur in the corner can be effectively compensated for. Therefore, uneven brightness is reduced more favorably.

(2) The end light source group may include at least a pair of light source groups each of which is located close to each outermost end of the bottom part in the column direction. In this way, a light shortage in respective corners at both ends in the column direction of the bottom part is effectively compensated for. Therefore, dark areas are unlikely to be formed and uneven brightness is reduced more favorably.

(3) The pair of light source groups included in the end side light source group may be driven to have substantially equal brightness. This way, the pair of light source strips included in the end light source group supply substantially the same amount of light to the corners each located at either end of the bottom part in the column direction. Therefore, there will hardly be any inconsistency in brightness between both ends of the bottom part in the column direction and thus uneven brightness is reduced more favorably.

(4) The end side light source group may include at least the light source group located close to the outermost end of the bottom part in the column direction, and a light source group adjacent to the at least the light source group on a middle side close to the middle portion of the bottom part, and the at least the light source group and the adjacent light source group may be driven to have substantially equal brightness. This way, as the light source group located closest to corners, and the light source group adjacent thereto so as to be closer to the middle portion, are included in the end side light source group having relatively higher brightness than the middle light source group, and as these light source groups are driven to have substantially the same brightness, a light shortage in corners of the bottom part can be compensated for more effectively. Thus, there will hardly be any dark areas and uneven brightness can be reduced even more favorably.

(5) The bottom part may be defined into a first end section in the column direction, a second end section located opposite to the first end section in the column direction, and a middle section provided between the first end section and the second end section. The light source group provided in each of the first end section and the second end section may be the end side light source group, and light source group provided in the middle section may be the middle light source group. With the bottom part thus defined into three sections, the first end section, second end section, and middle section, and with the light source drive controller configured to control light of at least one of the end side light source group and the middle light source group in accordance with the definition of the bottom part, the light adjusting control is made simple.

(6) The light source group located in the first end section and the light source group located in the second end section configure the end side light source group and may be driven to have substantially equal brightness. This way, there is hardly any inconsistency in brightness between the first end section and the second end section of the bottom part. Therefore, uneven brightness is reduced more favorably.

(7) The light source drive controller may be configured to control light of one of the end side light source group and the middle light source group. The light adjusting control will then be simpler than that of a configuration where light control is performed to both of the end side light source group and the middle light source group.

(8) The light source drive controller may be configured to control light of the light source groups arranged parallel to each other in the column direction such that brightness increases from the middle portion toward an end of the bottom part in the column direction. This way, as the brightness of the light source groups is controlled to increase from the middle portion toward the end of the bottom part in the column direction, the brightness uniformity of emitted light in the surface of the bottom part is made even higher, making any uneven brightness even less likely to occur.

(9) The light source drive controller may be configured to control light of the light source groups arranged parallel to each other in the column direction such that brightness increases from the middle portion toward each end in the column direction of the bottom part. This way, as the brightness of the light source groups is controlled to increase from the middle portion toward each end of the bottom part in the column direction, the brightness uniformity of emitted light in the surface of the bottom part is made even higher, making any uneven brightness even less likely to occur.

(10) The light source drive controller may be configured to control light of the light source groups arranged parallel to each other in the column direction such that brightness is symmetrical with a line passing through a center of the bottom part and extending along the row direction. This way, the brightness uniformity in the surface of the bottom part is made even higher, making any uneven brightness even less likely to occur.

(11) The light source drive controller may be configured to control light of the light source groups arranged parallel to each other in the column direction such that brightness increases proportionally as a distance from the center of the bottom part in the column direction. This way, as the brightness of the light source groups is controlled to increase proportionally as the distance from the center of the bottom part in the column direction increases, the brightness uniformity in the surface of the bottom part is made even higher, which is more preferable for reducing uneven brightness.

(12) The lighting device may further includes a light source board arranged along the bottom part and having the light source being mounted thereon, and a wiring pattern formed on the light source board and configured to connect in series the plurality of light sources of the light source groups. This way, as the plurality of light sources arranged in the row direction are connected in series by the wiring patterns, these light sources can all be turned on with substantially the same brightness. To increase the number of light sources near corners of the bottom part, for example, as conventionally done, a light source board specially designed to accommodate light sources mounted in an uneven distribution would have to be produced, which would lead to higher cost. In this regard, with the present invention, there is no need to employ the conventional technique, as the uneven brightness is reduced through light control of the light source groups as described above. Therefore, general-purpose LED boards, with regularly spaced light sources arranged thereon, for example, can be used. This enables further cost reduction.

(13) The light source board may have an elongated shape extending along the row direction, and the light source board may include a plurality of light source boards that are arranged parallel to each other in the column direction on the bottom part and spaced apart from each other. With this configuration, as compared to mounting light sources arranged in the row and column directions all on one light source board, the area of light source board is reduced by the length taking up the space between adjacent light source boards arranged parallel in the column direction. Thus the material cost associated with the light source boards is cut down. Therefore, the production cost is reduced, and also the weight is reduced.

(14) The lighting device may further include a connecting component. The light source board may include a plurality of light source boards that are arranged in the row direction on the bottom part. The connecting component may be configured to electrically connect the light source boards that are arranged in the row direction. With the light source boards arranged in the row direction being electrically connected to each other with the connecting components in this way, the lighting device may favorably be adapted to large size applications.

(15) The light source groups adjacent to each other in the column direction may be substantially equally spaced apart from each other. This makes the distribution density of light sources in the surface of the bottom part generally uniform in the column direction. Therefore, the brightness uniformity of the emitted light is made higher and there is hardly any uneven brightness.

(16) The light source groups adjacent to each other in the column direction may be spaced closer to each other in the middle portion than at ends of the bottom part in the column direction. With the light source groups arranged in this way, the density of light sources is lower at ends in the column direction of the bottom part. Therefore, there is a higher possibility that dark areas may be created in corners. However, in the present technology, since the end light source group is controlled to have relatively higher brightness than the middle light source group, any light shortage in corners can be favorably resolved, making possible to reduce uneven brightness.

(17) The light source drive controller may include a light control unit and a light source driver. The light control unit may be configured to output control signals for driving the end side light source group and the middle light source group to have respective predetermined brightness levels, and a light source driver may be configured to supply drive voltage to each of the end side light source group and the middle light source group based on the control signals output from the light control unit. With drive voltage thus being supplied from the light source driver to each of the end light source group and the middle light source group based on the control signals output from the light control unit, the end light source group and the central light source group are suitably driven to have their respective predetermined brightness levels.

(18) The light control unit may generate pulse signals as control signals, and the light source driver may be configured to drive the end side light source group and the middle light source group based on the pulse signals such that each of the end side light source group and the middle light source group has a different time period ratio of an ON time and an OFF time. This light control according to a so-called PWM (Pulse Width Modulation) light control method enables light control in a wider range. Therefore, the light source groups can be driven more suitably to reduce uneven brightness.

(19) The light sources may be LEDs. There will then be the advantages of high brightness and low power consumption.

(20) Diffuser lenses diffusing light from the light sources may be provided on the light exit side of the light sources. The light emitted from the light sources will then be diffused by the diffuser lenses before exiting. This reduces the likeliness of unevenness occurring in exiting light. Therefore, the number of light sources to be installed can be decreased, which leads to cost reduction.

To solve the above problems, the display device of the present invention includes the lighting device described above, and a display panel displaying images using light from the lighting device.

Since the lighting device that supplies light to the display panel is configured to reduce uneven brightness at low cost, the display device can display high-quality images at low cost.

The following configurations are preferable as embodiments of the present invention.

(1) The display panel may be a liquid crystal panel formed by a pair of substrates with liquid crystal sealed therebetween. Such display panel is suitable for various applications such as TV or PC displays and particularly suited for use as large screen displays.

(2) The light source drive controller may control light of at least one of the middle light source group and the end side light source group in accordance with an image display mode associated with an image displayed on the display panel. Such light control of light source groups in accordance with the image display mode enables appropriate display of images on the display panel with a matching image display mode.

(3) The image display mode may include a first image display mode and a second image display mode, at least brightness uniformity may have priority in the first image display mode and high brightness has priority in the second image display mode. In the first image display mode, the light source drive controller may control light of at least one of the middle light source group and the end side light source group. Therefore, the end side light source group may have relatively high brightness and the middle light source group may have relatively low brightness. In the second image display mode, the light source drive controller may control light of at least one of the middle light source group and the end side light source group. Therefore, the end side light source group and the middle light source group may have equal brightness. In this way, in the first image display mode, the end side light source group may be controlled to have relatively high brightness and the middle light source group may be controlled to have relatively low brightness. Therefore, the brightness uniformity of the image displayed on the display panel can be made high. Accordingly, the first image display mode is favorable in usage environments where images are desired to be displayed on the display panel with high presentation quality, for example in dark rooms, and particularly suitable for watching films. On the other hand, in the second image display mode, as the end side light source group and the middle light source group have equal brightness, images can be displayed on the display panel with high brightness. Therefore, the second image display mode is favorable in usage environments where high brightness is desired, for example, in bright rooms or outdoors.

(4) In the second image display mode, the light source drive controller may control light such that the middle light source group has substantially same brightness as the end side light source group that is in the first image display mode. In this way, in the second image display mode, both the end side light source group and the middle light source group are controlled to have substantially the same brightness as the relatively high brightness of the end side light source group that is in the first image display mode. Thus, a higher level of brightness than the first image display mode is achieved. When switching between the first and second image display modes, light control needs to be performed only to the middle light source group and not to the end side light source group. Thus the light adjusting control is made simple.

Advantageous Effect of the Invention

With the present invention, uneven brightness can be reduced at low cost.

BRIEF DESCRIPTION OF THE DRAWINGS

FIG. 1 is an exploded perspective view illustrating a schematic configuration of a television receiver according to a first embodiment of the present invention;

BEST MODE FOR CARRYING OUT THE INVENTION

First Embodiment

Figure 2:
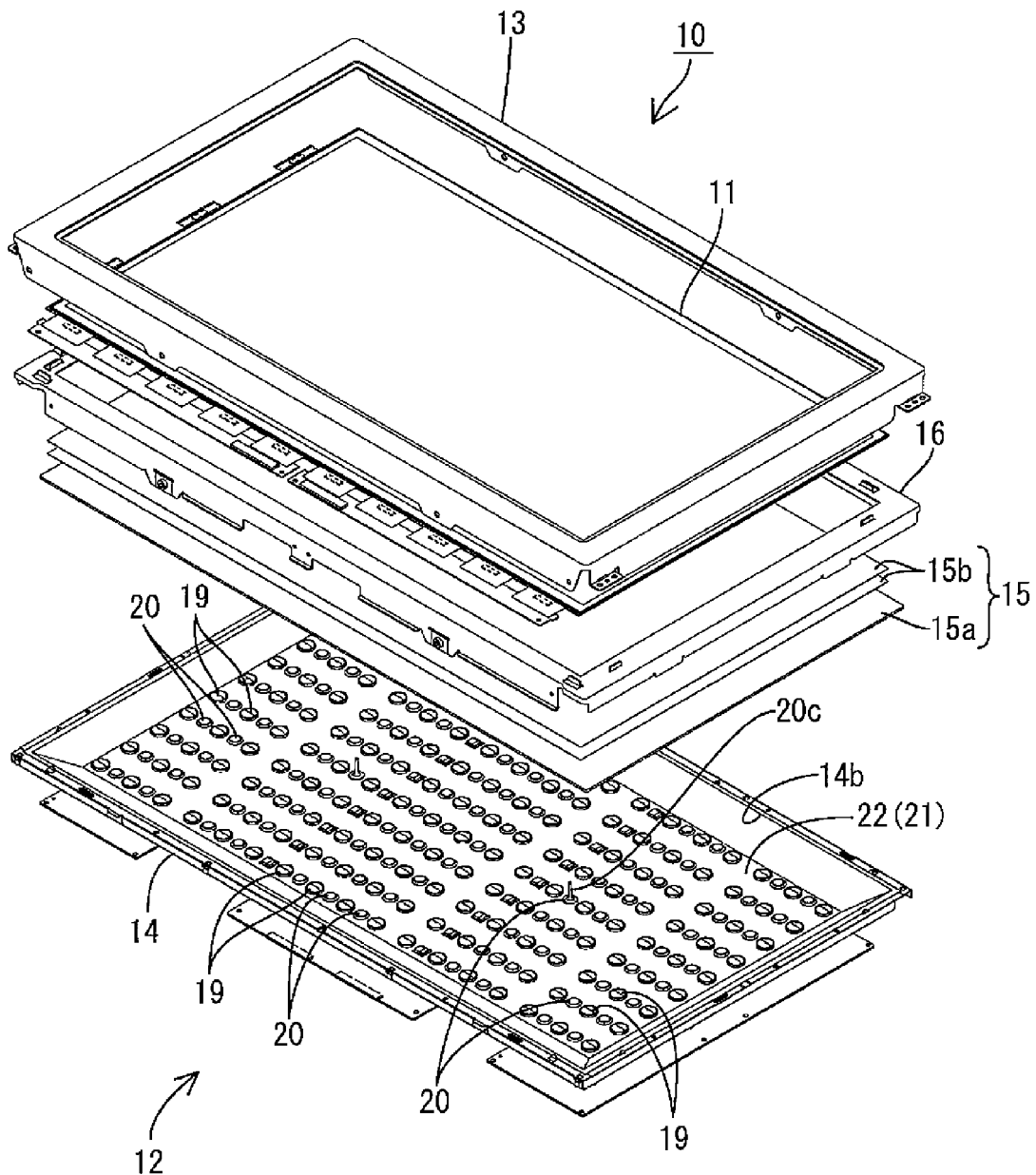
FIG. 2 is an exploded perspective view illustrating a schematic configuration of a liquid crystal display device included in the television receiver.
Figure 3:
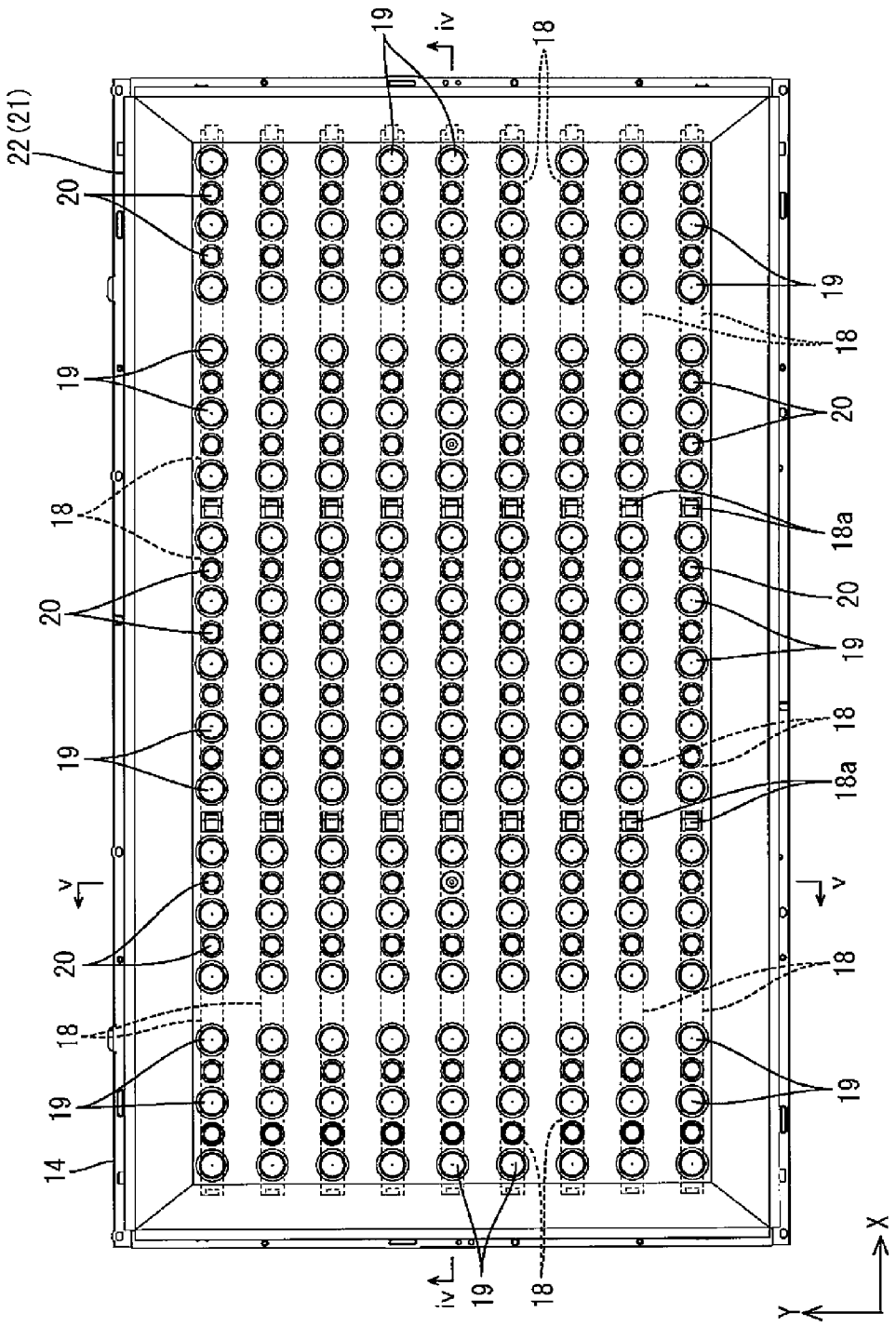
FIG. 3 is a plan view illustrating a configuration layout of LED boards, a first reflection sheet, and retainers in a chassis included in the liquid crystal display device.
Figure 4:
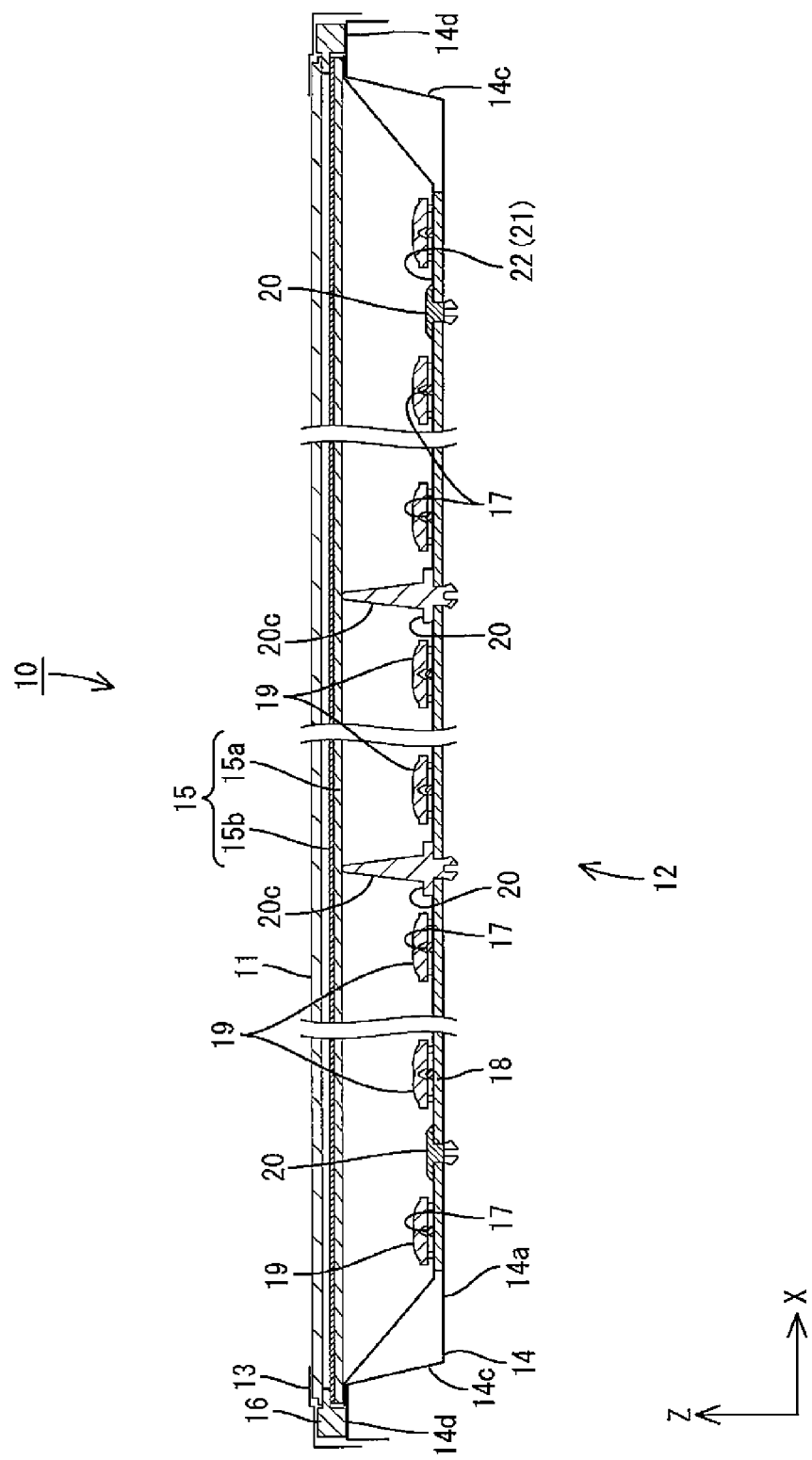
FIG. 4 is a cross sectional view of the liquid crystal display device taken along a iv-iv line in FIG. 3.

A first embodiment of the present invention will be described with reference to FIGS. 1 to 14. A liquid crystal display device 10 will be illustrated in this embodiment. The X-, Y-, and Z-axes are shown in some of the drawings, these axes being drawn to indicate the respective directions in respective drawings. In FIGS. 3 and 4, the upper side is the front side and the lower side is the backside.

A television receiver TV according to this embodiment includes the liquid crystal display device 10, front and rear cabinets Ca and Cb housing, such as to sandwich, the liquid crystal display device 10, a power source P, a tuner T, and a stand ST, as shown in FIG. 1. The liquid crystal display device (display device) 10 has a horizontally long (elongated) quadrate shape (four-sided right-angled polygon, or rectangle) as a whole, and is housed upright. This liquid crystal display device 10 includes a liquid crystal panel 11 as the display panel and a backlight unit (lighting device) 12 as an external light source as shown in FIG. 2, these being integrally held by a frame-like bezel 13 or the like. The liquid crystal display device 10 according to this embodiment can be switched between two image display modes to be described later in detail, upon an image display mode switch on an operation panel (not shown) being operated by a user.

Next, the liquid crystal panel 11 and the backlight unit 12 forming the liquid crystal display device 10 will be described one after another. The liquid crystal panel (display panel) 11 has a horizontally long quadrate shape in plan view, and made of a pair of glass substrates spaced apart a certain distance and bonded together, with liquid crystal sealed in between both glass substrates. One glass substrate includes switching components (such as TFTs) connected to source lines and gate lines orthogonally crossing each other, pixel electrodes connected to these switching components, and an alignment film, etc. The other glass substrate includes a color filter with respective color sections such as R (red), G (green), and B (blue) arrayed in a predetermined arrangement, counter electrodes, and an alignment film, etc. Both substrates have a polarizing plate on their outer side.

Next, the backlight unit 12 will be described in detail. The backlight unit 12 includes, as shown in FIG. 2, a substantially box-shaped chassis 14 having an opening 14b on the light exit surface side (liquid crystal panel 11 side), a set of optical members 15 covering the opening 14b of the chassis 14 (diffuser plate (light diffusing member) 15a, and a plurality of optical sheets 15b arranged between the diffuser plate 15a and the liquid crystal panel 11), and a frame 16 arranged along the outer edges of the chassis 14 and holding the outer edges of the set of optical members 15 between itself and the chassis 14. Inside the chassis 14 are LEDs 17 (Light Emitting Diodes) as light sources, LED boards 18 on which the LEDs 17 are mounted, and diffuser lenses 19 attached at positions corresponding to the LEDs 17 on the LED boards 18. The chassis 14 further includes therein retainers 20 configured to retain the LED boards 18 between themselves and the chassis 14, and a reflection sheet 21 that reflects light inside the chassis 14 toward the optical members 15. Outside the chassis 14 is provided an LED drive controller 24 (see FIG. 9) electrically connected to and controlling the drive of the LEDs 17 as required in accordance with the image display modes mentioned above. In this backlight unit 12, the optical members 15, and not the LEDs 17, are located on the light exit side. The constituent elements of the backlight unit 12 will each be described in detail below.

Figure 5:
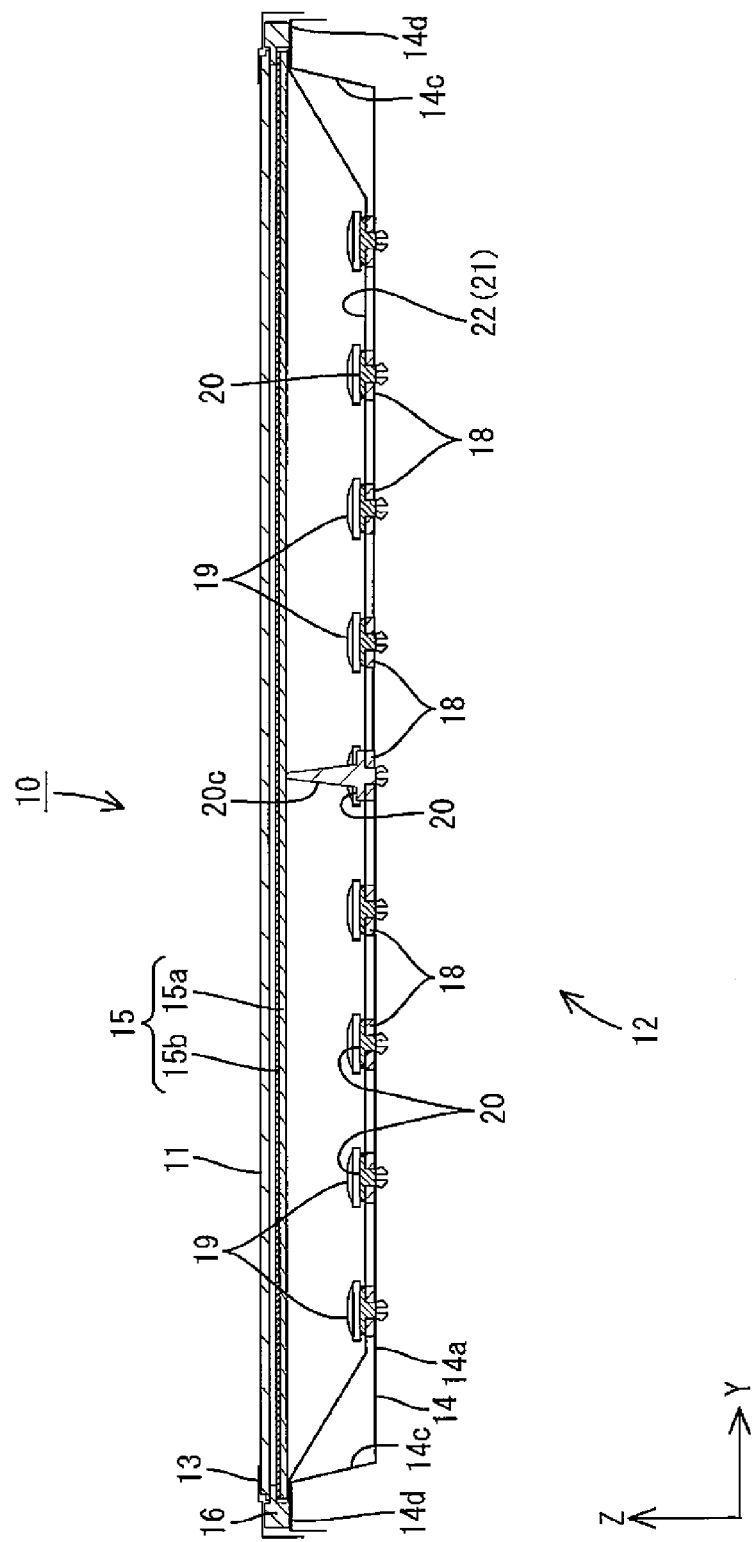
FIG. 5 is a cross sectional view of the liquid crystal display device taken along a v-v line in FIG. 3.

The chassis 14 is made of metal, and as shown in FIGS. 3 to 5, made up of a bottom plate 14a in a horizontally long quadrate shape (four-sided right-angled polygon, or rectangle) as with the liquid crystal panel 11, side plates 14c each standing up toward the front side (light exit side) from the outer edges of the respective sides (one pair of long sides and one pair of short sides) of the bottom plate 14*a*, and receiving plates 14*d* outwardly extending from the upright ends of the respective side plates 14*c*, thus taking on a shallow, substantially box-like (substantially shallow plate-like) shape open to the front side as a whole. The chassis 14 has its long side direction and short side direction aligned with the X-axis (horizontal) direction and Y-axis (vertical) direction, respectively. The receiving plates 14*d* of the chassis 14 are configured to receive the frame 16, and the optical members 15 to be described next, placed thereon from the front side. The frame 16 is screwed to the respective receiving plates 14*d*. The bottom plate 14*a* of the chassis 14 has mounting holes 14*e* opened therein for attaching the retainers 20. The mounting holes 14*e* are dispersed in the bottom plate 14*a* at positions corresponding to the mounting positions of the retainers 20.

The optical members 15 have a horizontally long quadrate shape (four-sided right-angled polygon) in plan view as with the liquid crystal panel 11 and the chassis 14 as shown in FIG. 2. The optical members 15 sit on the receiving plates 14*d* at their outer edges so as to cover the opening 14*b* of the chassis 14 and to be interposed between the liquid crystal panel 11 and the LEDs 17, as shown in FIG. 3. The optical members 15 include the diffuser plate 15*a* arranged on the backside (on the side of the LEDs 17, opposite to the light exit side), and the optical sheet 15*b* arranged on the front side (on the side of the liquid crystal panel 11, the light exit side). The diffuser plate 15*a* is formed by a substantially transparent resin base substrate having a predetermined thickness, with a multiplicity of diffusing particles dispersed in the substrate to have a function of diffusing the light being transmitted. The optical sheet 15*b* is a double-layer sheet (FIGS. 7 and 8) having a smaller thickness than the diffuser plate 15*a*. The optical sheet 15*b* may be suitably selected from applicable types including, specifically, for example, a diffuser sheet, a lens sheet, a reflection type polarizing sheet or the like.

The frame 16 has a frame-like shape that runs along the outer peripheral edges of the liquid crystal panel 11 and the optical members 15, as shown in FIG. 2. The frame 16 is configured to hold the outer edges of the optical members 15 between itself and the respective receiving plates 14*d* (FIGS. 4 and 5). This frame 16 is configured to receive the outer edges of the liquid crystal panel 11 from the backside, so as to hold the outer edges of the liquid crystal panel 11 between itself and the bezel 13 disposed on the front side (FIGS. 4 and 5).

Figure 7:
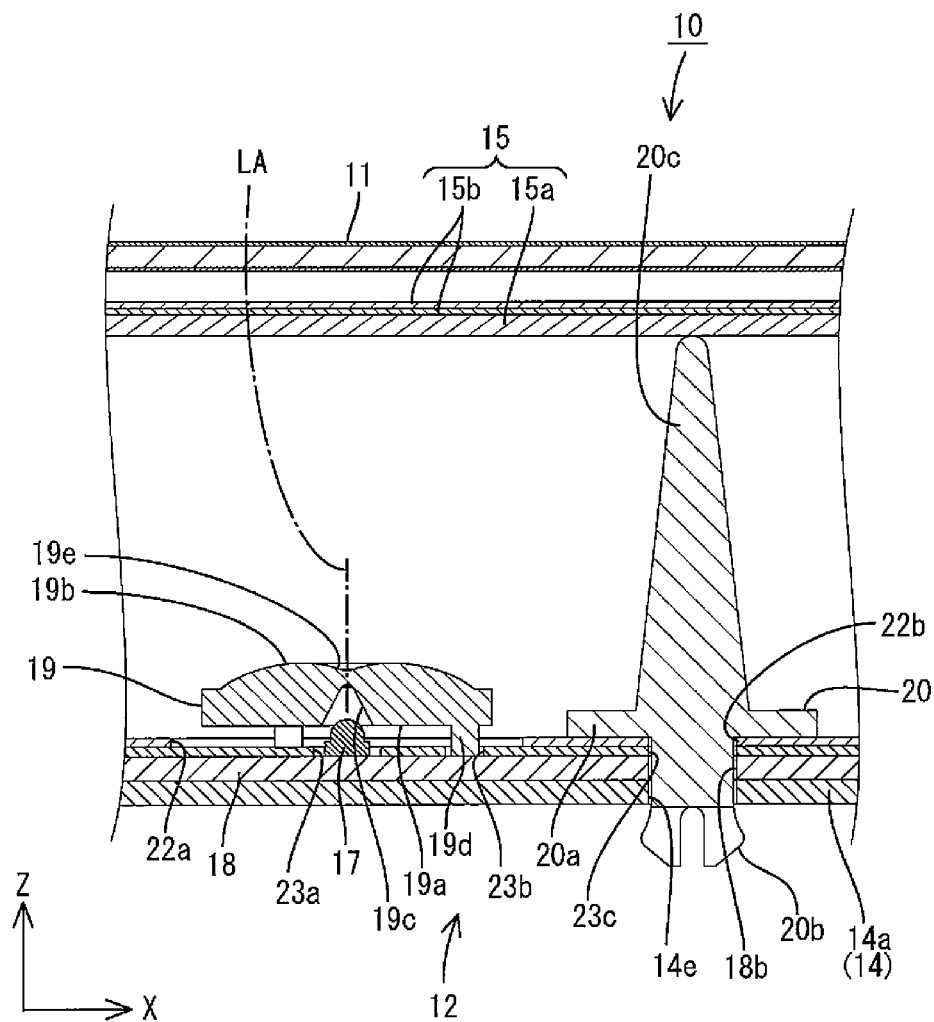
FIG. 7 is a cross sectional view of FIG. 6 taken along a vii-vii line.
Figure 8:
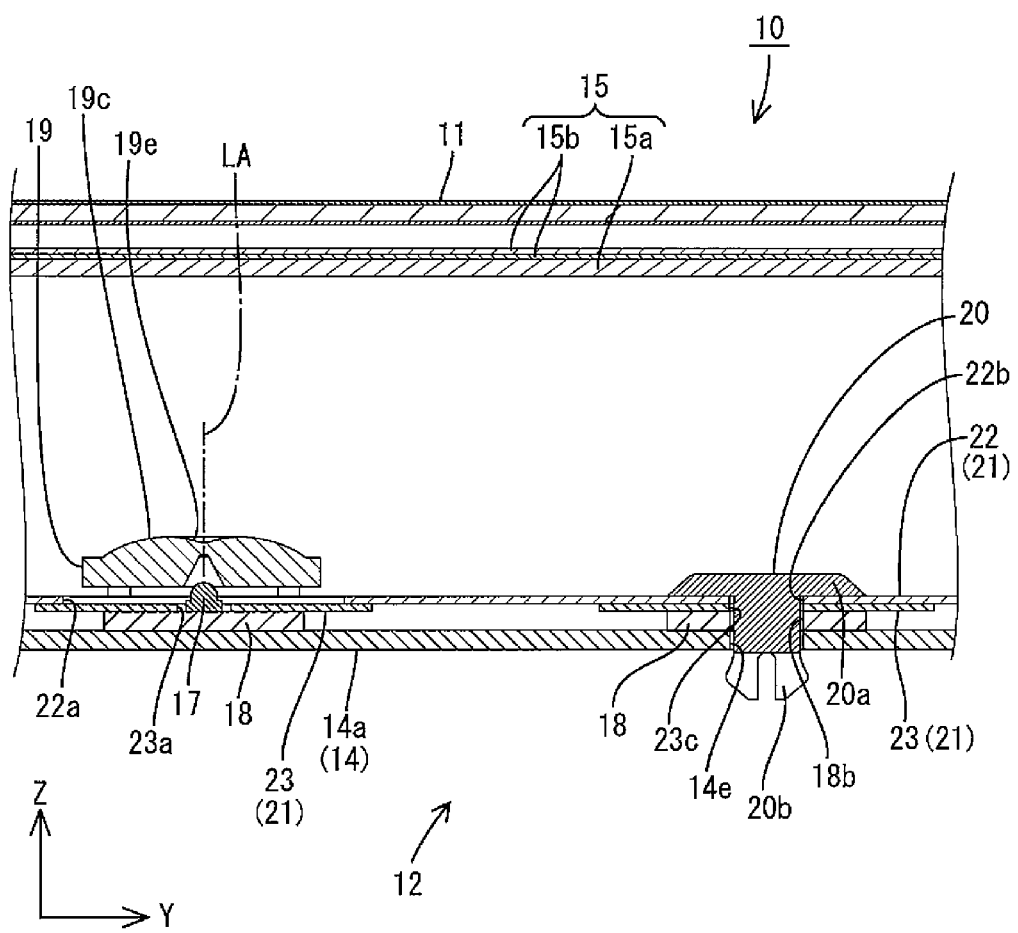
FIG. 8 is a cross sectional view of FIG. 6 taken along a viii-viii line.

Next, the LEDs 17 and the LED boards 18 on which the LEDs 17 are mounted will be described. Each LED 17 includes an LED chip sealed with a resin material on a board portion fixedly attached to the LED board 18, as shown in FIGS. 7 and 8. The LED chip mounted on the board portion has one dominant wavelength, specifically, the chip used here emits single blue light. The resin material sealing the LED chip, on the other hand, emits generally white light as a whole, due to a phosphor dispersedly mixed therein to emit light of a predetermined color when excited by the blue light emitted from the LED chip. Any of a yellow phosphor that emits yellow light, a green phosphor that emits green light, and a red phosphor that emits red light may be used either alone or in combination as required. This LED 17 is a so-called top type, having a light emitting surface on the side opposite to the mounting surface on which it is mounted on the LED board 18 (surface facing the optical members 15).

Figure 10:
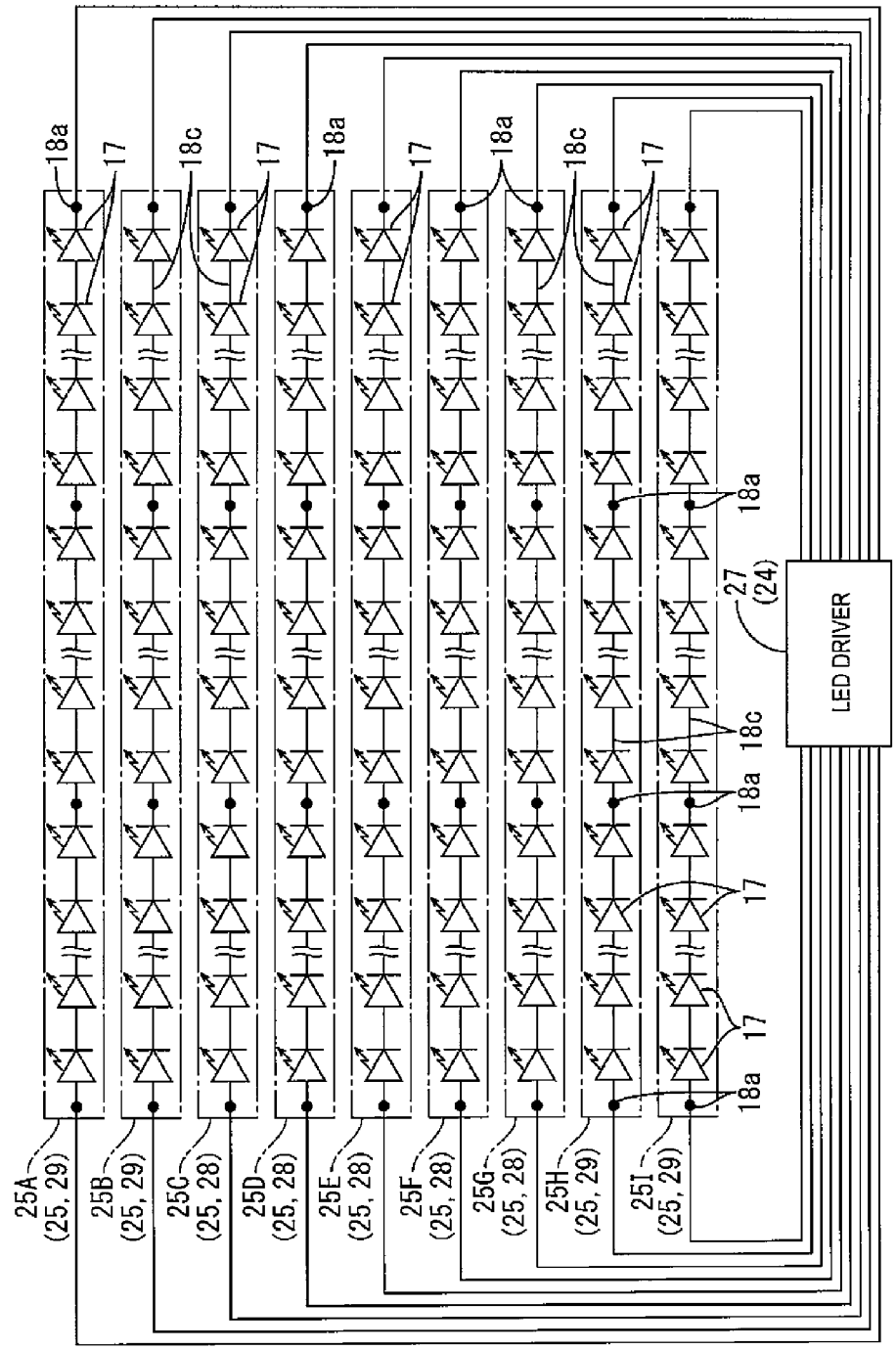
FIG. 10 is a circuit diagram illustrating how LEDs forming respective LED groups are connected to an LED driver.

Each LED board 18 includes a base member having a horizontally long quadrate shape in plan view and is housed in the chassis 14 to extend along the bottom plate 14*a*, with the long side direction aligned with the X-axis direction and the short side direction aligned with the Y-axis direction, as shown in FIGS. 3 and 4. The base member of the LED board 18 is made of metal such as the same aluminum material as that of the chassis 14, and formed with a wiring pattern 18*c* made of a metal film such as copper foil on the surface thereof via an insulating layer (FIG. 10). The material for the base member of the LED board 18 may be an insulating material such as ceramics. The LEDs 17, each configured as described above, are surface-mounted on a plate surface of this base member of the LED board 18 facing the front side (surface facing the optical members 15). A plurality of LEDs 17 is arranged side by side linearly along the long side direction (X-axis direction) of the LED board 18, and series-connected by the wiring pattern 18*c* formed on the LED board 18 (FIG. 10). The array pitch of LEDs 17 is substantially constant, i.e., the LEDs 17 are arrayed at equal intervals in the X-axis direction (row direction). Connectors 18*a* are provided at either end in the long side direction of the LED board 18.

A plurality of the thus configured LED boards 18 is arranged side by side each in the X-axis direction and parallel to the Y-axis direction inside the chassis 14, with their long sides and short sides aligned in the same directions, as shown in FIG. 3. Namely, both the LED boards 18 and the LEDs 17 mounted thereon are arranged in an array (in a matrix, or planar arrangement) inside the chassis 14, with their X-axis direction (long side direction of the chassis 14 and LED boards 18) and Y-axis direction (short side direction of the chassis 14 and LED boards 18) aligned with the row and column directions, respectively. More specifically, a total of twenty-seven LED boards 18, three in the X-axis direction and nine in the Y-axis direction, are arrayed inside the chassis 14. The plurality of (three) LED boards 18 arranged along the X-axis direction to form one row is electrically connected to each other by fitting connection between adjacent connectors 18*a*. The connectors 18*a* at either end in the X-axis direction of the chassis 14 are each electrically connected to the external LED drive controller 24 via a flexible wiring board or the like (not shown). Thus the LEDs 17 on the LED boards 18 forming one row are series-connected, and the drive of the plurality of LEDs 17 included in one row such as turning on and off is controlled collectively by the LED drive controller 24, which can contribute to cost reduction. Hereinafter, a plurality of LEDs 17 arranged side by side in the row direction and series-connected to each other will be referred to as one LED group 25. The array pitch of the LED boards 18 arranged along the Y-axis direction is substantially equal. Therefore, the LEDs 17 arrayed in a planar arrangement along the bottom plate 14*a* inside the chassis 14 are substantially equally spaced, both in the X-axis direction and the Y-axis direction. In other words, the plurality of LED groups 25 arranged parallel in the column direction is substantially equally spaced apart from each other. The distribution density of the LEDs 17 in the surface of the bottom plate 14*a* is thus made generally uniform.

Figure 6:
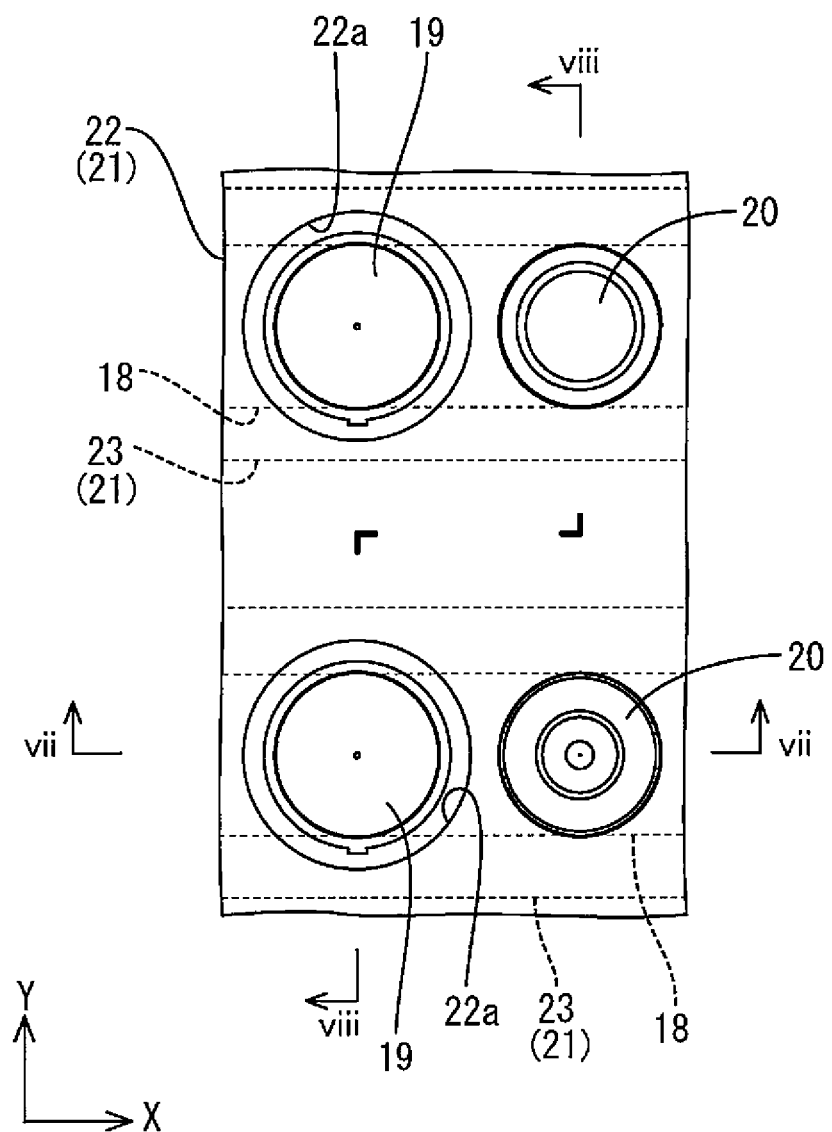
FIG. 6 is a plan view illustrating the configuration layout of the LED boards and retainers in detail.

The diffuser lenses 19 are made of a substantially transparent (highly light-transmissive) synthetic resin material having a higher refractive index than air (such as polycarbonate or acrylic resin). The diffuser lenses 19 have a predetermined thickness and are substantially circular in plan view, each attached to the LED boards 18 to cover the LEDs 17 individually from the front side, i.e., to overlap the respective LEDs 17 when viewed in plan as shown in FIGS. 6 to 8. The light with high directivity from the LEDs 17 is diffused by and exits from the diffuser lenses 19. Namely, the directivity of the light from the LEDs 17 is lowered as the light passes through the diffuser lenses 19. Therefore, the adjacent LEDs 17 can be spaced apart wider without the possibility of the regions therebetween being recognized as dark areas. This enables a fewer number of LEDs 17 to be installed. The diffuser lenses 19 are positioned substantially concentric with the LEDs 17 when viewed in plan.

Each diffuser lens 19 has a surface facing the backside, opposite to the LED board 18 (LED 17), as a light incident surface 19a to which light from the LED 17 enters, and a surface facing the front side, opposite to the optical members 15, as a light exit surface 19b from which the light exits. Of these, the light incident surface 19a includes, while it extends generally parallel to the plate surface of the LED board 18 (in the X-axis and Y-axis directions), surfaces inclined to the optical axis LA of the LED 17 because of a light incident-side recess 19c formed in a region overlapping with the LED 17 when viewed in plan, as shown in FIGS. 7 and 8. The light incident-side recess 19c is generally a conical concave with an inverted V-shape cross section, and positioned substantially concentric to the diffuser lens 19. Light emitted from the LED 17 and entering the light incident-side recess 19c is refracted by the inclined surfaces to enter the diffuser lens 19 at a wider angle. A mounting leg 19d, which is a configuration for mounting the lens to the LED board 18, protrudes from the light incident surface 19a. The light exit surface 19b is configured to be flat and substantially spherical so as to refract the light and cause the light to exit from the diffuser lens 19 at a wider angle. The light exit surface 19b includes a substantially bowl-like light exit-side recess 19e in a region overlapping the LED 17 when viewed in plan. This light exit-side recess 19e enables most of the light from the LED 17 to be refracted and exit at a wider angle, or part of the light from the LED 17 to be reflected toward the LED board 18.

Next, the retainers 20 will be described. The retainers 20 are made of synthetic resin such as polycarbonate, having a white surface with excellent reflectivity. Each retainer 20 includes a main body 20a extending along the plate surface of the LED board 18, and a fastening part 20b protruding from the main body 20a to the backside or toward the chassis 14 and fastened to the chassis 14, as shown in FIGS. 6 to 8. The main body 20a is a substantially circular disc in plan view and configured to hold both the LED board 18 and the reflection sheet 21 to be described next between itself and the bottom plate 14a of the chassis 14. The fastening part 20b is configured to pass through a through hole 18b and the mounting hole 14e respectively formed in the LED board 18 and the bottom plate 14a of the chassis 14 at a position corresponding to the mounting position of the retainer 20 and be locked to the bottom plate 14a. A large number of such retainers 20 are arranged in a matrix in the surfaces of the LED boards 18 as shown in FIG. 3, more specifically, each being positioned between the diffuser lenses 19 (LEDs 17) adjacent to each other in the X-axis direction.

A pair of retainers 20 arranged in the center of the screen have support parts 20c protruding from the main bodies 20a toward the front side as shown in FIGS. 2 to 4 such that the diffuser plate 15a can be supported from the backside by these support parts 20c. This helps to maintain the positional relationship between the LEDs 17 and the optical members 15 in the Z-axis direction constant, as well as reduce the possibility of accidental deformation of the optical members 15.

Next, the reflection sheet 21 will be described. The reflection sheet 21 is made up of a first reflection sheet 22 of a size substantially entirely covering the inner surface of the chassis 14, and second reflection sheets 23 of a size individually covering each of the LED boards 18. Both reflection sheets 22 and 23 are made of synthetic resin and have a white surface with excellent light reflectivity. Both reflection sheets 22 and 23 extend along the bottom plate 14a (LED boards 18) inside the chassis 14.

The first reflection sheet 22 will be described first. Most of the middle part of the first reflection sheet 22 extending along the bottom plate 14a of the chassis 14 forms a main body 22a as shown in FIG. 3. The main body 22a has lens insertion holes 22b that allow both the respective LEDs 17 and respective diffuser lenses 19 covering the LEDs 17 in the chassis 14 to pass through. The lens insertion holes 22b are arranged in rows in a matrix in the main body 22a at positions overlapping with the respective LEDs 17 and diffuser lenses 19 when viewed in plan. Each lens insertion hole 22b is circular in plan view, with a larger diameter than that of the diffuser lens 19, as shown in FIG. 6. Therefore, the first reflection sheet 22 can be laid out in the chassis 14 reliably with or without dimensional errors by passing the respective diffuser lenses 19 through the respective lens insertion holes 22b. This first reflection sheet 22 covers the regions between adjacent diffuser lenses 19 and an outer circumferential region inside the chassis 14 as shown in FIG. 3 so as to reflect light toward these regions to the optical members 15. The outer circumferential portion of the first reflection sheet 22 stands up such as to cover the side plates 14c and receiving plates 14d of the chassis 14, the portions placed on the receiving plates 14d being sandwiched between the chassis 14 and the optical members 15, as shown in FIGS. 4 and 5. The first reflection sheet 22 includes inclined portions connecting the main body 22a and the portions placed on the receiving plates 14d.

The second reflection sheets 23, on the other hand, have substantially the same outer shape as the LED boards 18, i.e., rectangular in plan view, as shown in FIG. 6. The second reflection sheets 23 are overlapped on the front side surface of the LED boards 18, opposite to the diffuser lenses 19, as shown in FIGS. 7 and 8. Namely, the second reflection sheets 23 are interposed between the diffuser lenses 19 and the LED boards 18. Therefore, light returned from the diffuser lenses 19 toward the LED boards 18, or light entering from a space outside the diffuser lenses 19 when viewed in plan into the space between the diffuser lenses 19 and the LED boards 18, can be reflected by the second reflection sheets 23 back to the diffuser lenses 19. Thereby, the usage efficiency of light is enhanced, leading to improved brightness. In other words, a sufficient level of brightness can be achieved even with a fewer number of LEDs 17 installed in an effort to reduce the cost.

Each second reflection sheet 23 has a long side dimension substantially the same as that of the LED board 18, while it has a short side dimension larger than that of the LED board 18. The short side dimension of the second reflection sheet 23 is even larger than the diameters of the diffuser lenses 19 and the lens insertion holes 22b of the first reflection sheet 22, as shown in FIGS. 6 and 8. This allows the edges of the lens insertion holes 22b in the first reflection sheet 22 to be laid over on the front side of the second reflection sheets 23. Thus, the first reflection sheet 22 and the second reflection sheets 23 are continuously laid out without interruption in plan view inside the chassis 14. Therefore, the chassis 14 or the LED boards 18 are hardly exposed on the front side through the lens insertion holes 22b. Accordingly, the light inside the chassis 14 can be efficiently reflected toward the optical members 15, which is extremely favorable for improvement of brightness. Each second reflection sheet 23 further includes LED insertion holes 23a for passing through the respective LEDs 17 and leg insertion holes 23b for passing through mounting legs 19d of the respective diffuser lenses 19, each opened to extend through the sheet at positions overlapping the LEDs and diffuser lenses when viewed in plan.

Figure 9:
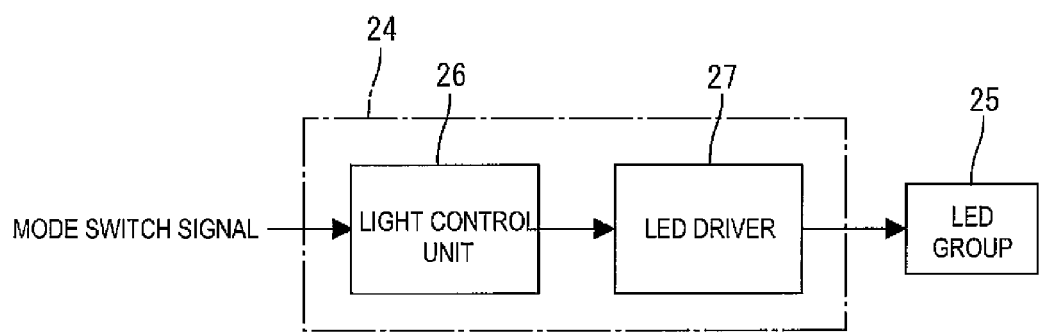
FIG. 9 is a block diagram illustrating an electrical configuration for driving LED groups.

In the backlight unit 12 according to this embodiment, a plurality of LED groups 25 each formed by a plurality of LEDs 17 arranged side by side in the row direction (X-axis direction) is arranged parallel in the column direction (Y-axis direction) on the bottom plate 14a of the chassis 14. Therefore, the respective LED groups 25 can be driven by the LED drive controller 24 with different brightness levels in accordance with their positions in the column direction (Y-axis direction) on the bottom plate 14a of the chassis 14. The LED drive controller 24 includes, as shown in FIGS. 9 and 10, a light control unit 26 outputting control signals for driving the respective LED groups 25 with predetermined brightness upon receiving a mode switch signal generated by operation of the image display mode switch included in the liquid crystal display device 10 as mentioned above, and an LED driver 27 supplying drive voltage to each of the LEDs 17 contained in the respective LED groups 25 based on the control signals output from the light control unit 26. The light control unit 26 generates pulse signals as the control signals, and the LED driver 27 is configured to drive each of the LEDs 17 in the respective LED groups 25 based on the pulse signals so as to achieve a predetermined ratio between the time the LEDs are on and the time the LEDs are off, this ratio between the ON time and OFF time being variable in accordance with the pulse signals. Namely, the LED drive controller 24 according to this embodiment is configured to control the light of the respective LED groups 25 (LEDs 17) by PWM (Pulse Width Modulation).

Here, there are two image display modes: A first image display mode that gives priority to brightness uniformity (evenness) in the display surface of the liquid crystal panel 11, and a second image display mode that gives priority to high brightness in the display surface of the liquid crystal panel 11. Therefore, the LED drive controller 24 can control the drive of the respective LED groups 25 as required in accordance with the switching between the two types of image display modes. In the second image display mode of the two modes, the LED drive controller 24 turns on the respective LEDs 17 such that all the LED groups 25 emit light of the same brightness. Namely, in the second image display mode, the LED drive controller 24 drives all the LEDs 17 (LED groups 25) such that the ratio between the ON time and the OFF time is the same. Thereby, the brightness of the display surface of the liquid crystal panel 11 can be made sufficiently high (see FIGS. 13 and 14).

Hereinafter, where the respective LED groups 25 need to be distinguished from each other, the nine LED groups 25 arranged parallel in the column direction on the bottom plate 14a of the chassis 14 will be referred to as first LED group 25A, second LED group 25B, . . . eighth LED group 25H, and ninth LED group 25I, sequentially from the top in FIG. 11. The first LED group 25A and the ninth LED group 25I are each arranged at either outermost position in the column direction on the bottom plate 14a of the chassis 14. The fifth LED group 25E is located at the center position in the column direction on the bottom plate 14a of the chassis 14.

Figure 11:
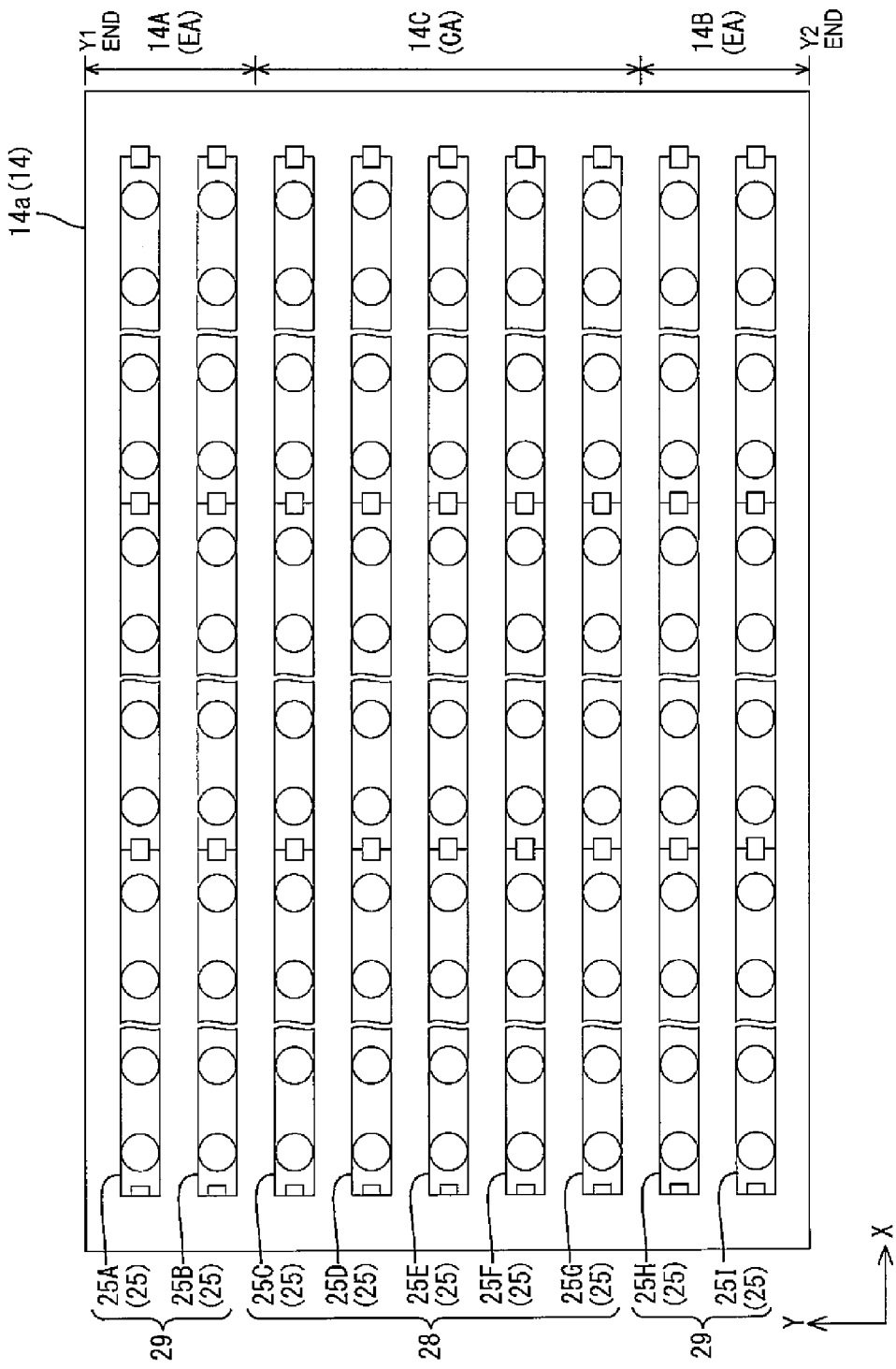
FIG. 11 is a schematic plan view illustrating the configuration layout of the LED groups (and respective LED boards) in the chassis.

In the first image display mode of the two modes, the LED drive controller 24 is configured to drive a middle LED group 28 located in a middle part in the column direction on the bottom plate 14a of the chassis 14 as shown in FIG. 11 to emit light of relatively low brightness, and to drive an end LED group 29 located closer to an end than the middle LED group 28 to emit light of relatively high brightness. Namely, in the first image display mode, the brightness of the end LED group 29 closer to corners of the bottom plate 14a of the chassis 14 where the amount of light tends to be insufficient is made relatively high to avoid creation of dark areas in corners of the bottom plate 14a. In addition, the brightness of the middle LED group 28 where the light amount is sufficient is made relatively low. Thus, any inconsistency in brightness between the ends and the center in the column direction of the bottom plate 14a is reduced. Therefore, the brightness uniformity in the display surface of the liquid crystal panel 11 can be made sufficiently high (see FIGS. 12 and 14).

The end LED group 29 includes at least a pair of LED groups 25, one located at one end and the other located at the other end in the column direction of the bottom plate 14a, as shown in FIG. 11. More specifically, the end LED group 29 includes the first LED group 25A and the ninth LED group 25I located at either outermost end in the column direction of the bottom plate 14a, as well as the second LED group 25B and the eighth LED group 25H adjacent to the first and the ninth groups on the middle side in the column direction, i.e., a total of four groups. In other words, the bottom plate 14a of the chassis 14 is divided in the Y-axis direction (column direction) into a first end section 14A on the upper side in FIG. 11, a second end section 14B on the lower side in the same drawing opposite to the first end section 14A, and a middle section 14C sandwiched between the first end section 14A and the second end section 14B. The two each LED groups 25 located in the first end section 14A and the second end section 14B constitute the end LED group 29. On the other hand, the middle LED group 28 includes a plurality of LED groups 25 located closer to the center in the column direction of the bottom plate 14a than these groups forming the end LED group 29, more specifically, a total of five, the third LED group 25C to the seventh LED group 25G. In other words, the five LED groups 25 located in the middle section 14C sandwiched between the first end section 14A and the second end section 14B of the bottom plate 14a of the chassis 14 constitute the middle LED group 28. The first end section 14A and the second end section 14B of the bottom plate 14a of the chassis 14 can also be referred to as end LED group areas EA where the groups of the end LED group 29 are located, while the middle section 14C can be referred to as a middle LED group area CA where the middle LED group 28 is located.

Next, the drive of the respective LED groups 25 in the first image display mode will be described. In the first image display mode, while the end LED group 29 is controlled by the LED drive controller 24 to have the same brightness as that of the LED groups 25 of the second image display mode, the middle LED group 28 is controlled to emit light of relatively lower brightness than that of the end LED group 29 (of the LED groups 25 of the second image display mode). Thus, the LED groups 25 arranged on the bottom plate 14a of the chassis 14 are driven to have two levels of brightness. Namely, when the first and second image display modes are switched from one to another, the brightness of the end LED group 29 is not changed, i.e., the switching of the image display modes does not involve light control of the end LED group. On the other hand, switching between the first and second image display modes involves light control of the middle LED group 28 as its brightness is changed. In short, the LED drive controller 24 controls light of only the middle LED group 28 as the image display modes are switched from one to another.

More specifically, as shown in FIG. 9, when a mode switch signal is output to the light control unit 26 in the LED drive controller 24 as the second image display mode is switched to the first image display mode, the light control unit 26 outputs the same pulse signal as that in the second image display mode to the end LED group 29, while outputting a different pulse signal from that of the second image display mode to the middle LED group 28, based on which the LED driver 27 drives the end LED group 29 such that the ratio between the ON time and the OFF time is the same as that in the second image display mode, while driving the middle LED group 28 such that the ratio is changed such that the ON time is shorter and the OFF time is longer than that of the second image display mode (of the end LED group 29). Conversely, when a mode switch signal is output to the light control unit 26 in the LED drive controller 24 as the first image display mode is switched to the second image display mode, the light control unit 26 outputs a different pulse signal from that in the first image display mode to the middle LED group 28, based on which the LED driver 27 drives the middle LED group 28 with the ratio changed such that the ON time is longer and the OFF time is shorter than in the first image display mode. The middle LED group 28 is controlled by the LED drive controller 24 in this manner as the image display modes are switched. Therefore, in the first image display mode, the middle LED group 28 emits light of substantially the same brightness as that of the end LED group 29 that is controlled to constantly emit light of the same brightness irrespective of the image display mode. All the LED groups 25 (LEDs 17) contained in the end LED group 29 are controlled to have the same brightness. Similarly, all the LED groups 25 (LEDs 17) contained in the middle LED group 28 are controlled to have the same brightness in the respective image display modes.

The effects of this embodiment, having the configuration described above, will be described next. When the liquid crystal display device 10 is in use, the LED drive controller 24 drives the LEDs 17 included in the backlight unit 12, while image signals are sent to the liquid crystal panel 11. Therefore, a predetermined image is displayed on the display surface of the liquid crystal panel 11. As the LEDs 17 are turned on, light emitted therefrom first enters the light incident surfaces 19*a* of the diffuser lenses 19, as shown in FIGS. 7 and 8. Most of this light enters the inclined surfaces in the light incident-side recesses 19*c* of the light incident surfaces 19*a* and is refracted in accordance with the inclination angle such that the light enters the diffuser lenses 19 at a wider angle. The light that has entered the diffuser lenses 19 then exits from the light exit surfaces 19*b* after propagating through the lenses. Since the light exit surfaces 19*b* have a flat, substantially spherical shape, the light is further refracted at the interface with the outer air layer and exits at an even wider angle. Moreover, with the substantially bowl-shaped light exit-side recesses 19*e* formed in regions on the light exit surfaces 19*b* where the amount of light from the LEDs is maximum and having a flat, substantially spherical circumferential surface, the light can be refracted and emitted at a wider angle, or reflected toward the LED board 18 side by this circumferential surface of the light exit-side recesses. Part of light returned to the LED boards 18 is reflected by the second reflection sheets 23 toward and back into the diffuser lenses 19, allowing for efficient use of light to achieve high brightness.

Since the light from the LEDs 17 with high directivity is diffused by the diffuser lenses 19 at a wide angle in this way, the distribution of the light that has reached the optical members 15 can be made uniform in the surface of the optical members 15. In other words, the use of the diffuser lenses 19 makes it unlikely that regions between adjacent LEDs 17 are visually recognized as dark areas, which allows the distance between LEDs 17 to be increased, which in turn enables a reduction in the number of installed LEDs 17 without causing uneven brightness. With the number of installed LEDs 17 reduced, the distance between adjacent LEDs 17 can be made larger. Therefore, the retainers 20 can be arranged in the space thus made available, these retainers 20 allowing for fastening of the LED boards 18.

Figure 12:
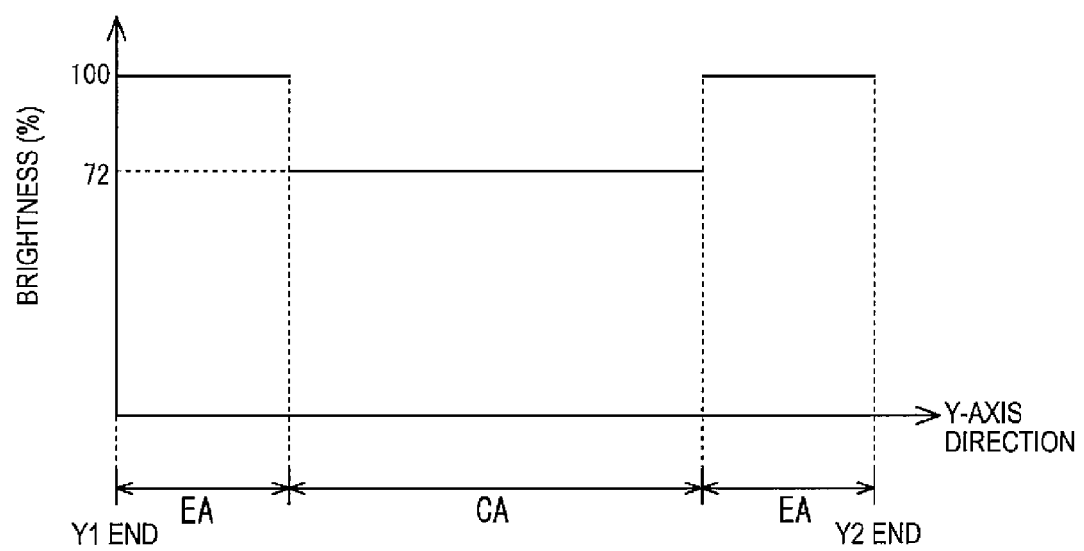
FIG. 12 is a graph showing changes in brightness of light emitted from the LED groups in the short side direction (column direction) of the chassis in the first image display mode.
Figure 13:
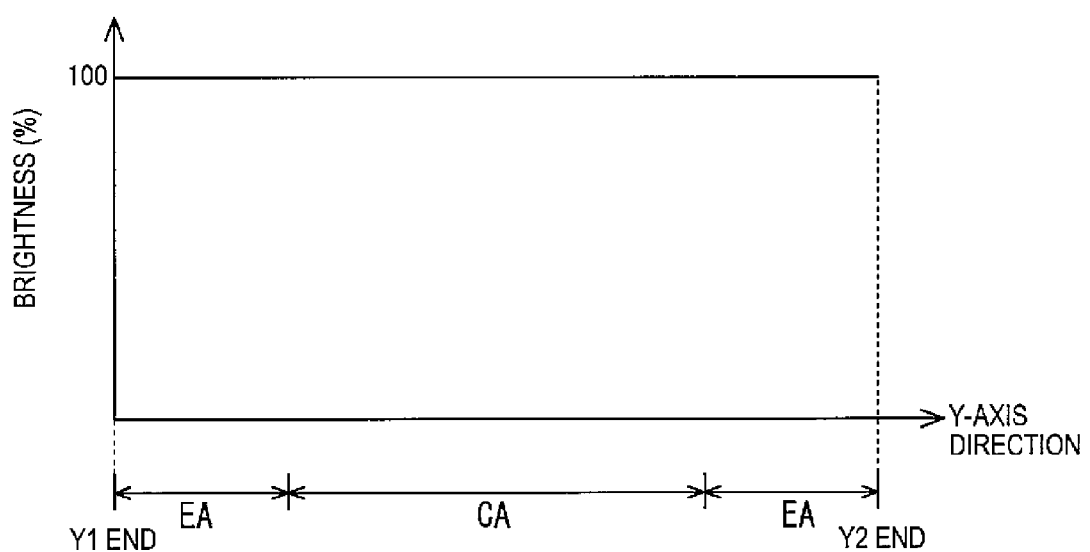
FIG. 13 is a graph showing changes in brightness of light emitted from the LED groups in the short side direction (column direction) of the chassis in the second image display mode.
Figure 14:
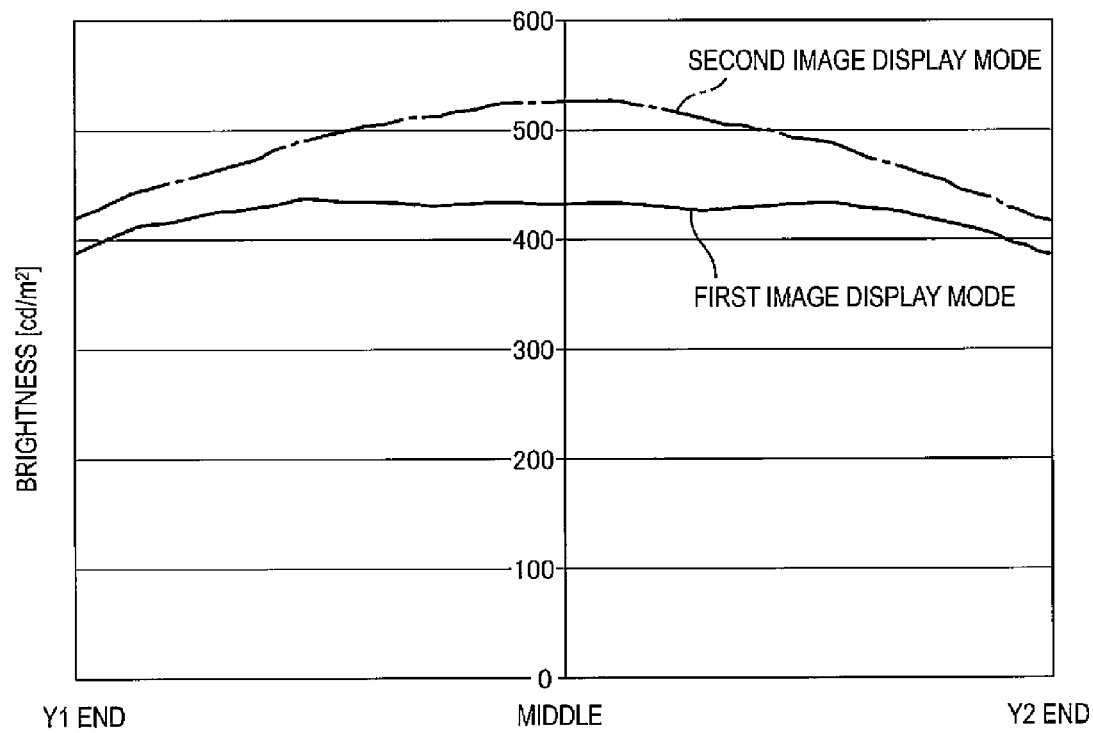
FIG. 14 is a graph showing changes in brightness of light emitted from the display surface of the liquid crystal panel in the short side direction (column direction) of the chassis in both image display modes.

The liquid crystal display device 10 according to this embodiment includes an image display mode switch (not shown) on the operation panel, and is configured to switch between the first image display mode that gives priority to brightness uniformity and the second image display mode that gives priority to high brightness upon a user operating the image display mode switch, as mentioned above. In the second image display mode, the LED drive controller 24 drives all the LED groups 25 to have the same brightness as shown in FIG. 13. FIGS. 12 and 13 show the brightness levels relative to the brightness of the LED groups 25 in the second image display mode as a reference (100%). The "brightness" in FIGS. 12 and 13 refers to that of the light exiting from the LED groups 25. The distribution in the Y-axis direction (column direction) of brightness of the light exiting from the display surface of the liquid crystal panel 11 in this mode has its peak at the center, from which the brightness drops gradually toward both ends, as shown in FIG. 14. Human beings watching the liquid crystal display device 10 tend to feel that the device is "bright" when the brightness of the display surface is higher in the center. Therefore, the second image display mode is favorable in usage environments where the liquid crystal display device 10 is desired to be bright, for example, in bright rooms or outdoors. In FIG. 14, the brightness in the second image display mode is indicated by a one dot chain line. The "brightness" in FIG. 14 refers to that of the light exiting from the display surface of the liquid crystal panel 11.

On the other hand, in the first image display mode, as shown in FIG. 12, the LED drive controller 24 drives the end LED group 29 and the middle LED group 28 to have relatively high brightness and relatively low brightness, respectively. More specifically, while the end LED group 29 is driven to have the same brightness (100%) as in the second image display mode, the middle LED group 28 is driven to have lower brightness (of, for example, about 72%) than that of the middle LED group 28 and the end LED group 29 in the second image display mode. The distribution in the Y-axis direction (column direction) of brightness of the light exiting from the display surface of the liquid crystal panel 11 in this mode has a lower peak, with less amount of reduction (change) from the center toward both ends as compared to the second image display mode, thus being flat as a whole, as shown in FIG. 14. In other words, the difference between the brightness at the center in the Y-axis direction (peak brightness) and the brightness at ends (bottom brightness) is smaller in the first image display mode than in the second image display mode. To further rephrase it, the ratio of the brightness at ends (bottom brightness) to the brightness at the center in the Y-axis direction (peak brightness) is higher in the first image display mode than in the second image display mode. Namely, the brightness uniformity on the display surface of the liquid crystal display device 10 is high in the first image display mode, this high brightness uniformity leading to higher "image quality" such as better presentation of displayed images. Accordingly, the first image display mode is favorable in usage environments where high image quality is desired, for example in dark rooms, and in particular suitable for watching films. In FIG. 14, the brightness in the first image display mode is indicated by a solid line.

As mentioned before, in the first image display mode, while the end LED group 29 is driven to have the same brightness as in the second image display mode, the middle LED group 28 is driven to have lower brightness than in the second image display mode. Therefore, switching the first and second image display modes from one to the other does not involve light control of the end LED group 29 as the brightness remains the same, while it requires light control of the middle LED group 28 to change the brightness. The light control, more specifically, when switching from the first image display mode to the second image display mode, of the middle LED group 28 is achieved by the LED drive controller 24 performing PWM light control such as to make the ON time longer and the OFF time shorter than those of the first image display mode to achieve a higher brightness level than the first image display mode. Since the middle LED group 28 at this time has the same brightness as that of the end LED group 29, the light control unit 26 in the LED drive controller 24 outputs the same drive signals (pulse signals). Contrarily, when switching from the second image display mode to the first image display mode, the LED drive controller 24 performs PWM light control such as to make the ON time shorter and the OFF time longer than those of the second image display mode to achieve a lower brightness level than that of the second image display mode (of the end LED group 29). Switching of the image display modes entails light control of only the middle LED group 28 and not of the end LED group 29 as described above. Therefore, the light adjusting control is simple, which contributes to cost reduction. Moreover, the LED groups 25 arranged in the backlight unit 12 are divided into two groups (middle LED group 28 and end LED group 29) in the first image display mode and driven at two brightness levels. Therefore, the control for driving the respective LED groups 25 is made simple, leading to further cost reduction.

As described above, the backlight unit 12 of this embodiment includes LEDs 17 as a plurality of light sources, the chassis 14 having the bottom plate 14a that is quadrate in plan view and housing the LEDs 17, and the LED drive controller 24 controlling the drive of the LEDs 17. The plurality of LEDs 17 is arranged in a matrix in the row direction (X-axis direction) and in the column direction (Y-axis direction) along the bottom plate 14a. The LED groups 25 formed by the plurality of LEDs 17 arrayed along the row direction include groups forming the middle LED group 28 located on the middle side in the column direction of the bottom plate 14a, and groups forming the end LED group 29 located closer to an end than the former. The LED drive controller 24 is configured to control light of at least one of the middle LED group 28 and the end LED group 29 such that the end LED group 29 has relatively high brightness and the middle LED group 28 has relatively low brightness.

In a configuration where a plurality of LEDs 17 is arranged in a matrix along the bottom plate 14a of the chassis 14, there is a possibility that dark areas may be formed in corners of the bottom plate 14a where the light tends to be insufficient. One possible solution would be, for example, to arrange more LEDs 17 near the corners of the bottom plate 14a, which, however, would lead to higher cost due to the increased number of LEDs 17 to be installed. In this regard, with this embodiment, the LED drive controller 24 driving the LEDs 17 controls light of at least one of the middle LED group 28 and the end LED group 29, which are LED groups 25 each formed by the LEDs 17 arranged along the row direction, such that the end LED group 29 located closer to an end in the column direction of the bottom plate 14a has relatively high brightness and the middle LED group 28 located on the middle side of the bottom plate 14a has relatively low brightness. In this way, any shortage of light in end sections closer to the corners of the bottom plate 14a where the light tends to be insufficient is compensated for by the end LED group 29 having relatively high brightness, while the brightness of the middle LED group 28 on the middle side where there is sufficient light is made relatively low so as to reduce any inconsistency in brightness between the middle and end sections. Thus, the brightness of emitted light is made highly uniform in the surface of the bottom plate 14a without taking the approach that requires an increased number of LEDs 17 to be installed, thereby lowering the cost and reducing uneven brightness.

The end LED group 29 includes at least an LED group 25A (25I) located at an outermost end in the column direction of the bottom plate 14a. The LED group 25A (25I) located outermost in the column direction of the bottom plate 14a is one that is closest to a corner where light tends to be insufficient. Since the LED group 25A (25I) closest to a corner is included in the end LED group 29 with relatively higher brightness than the middle LED group 28 in this embodiment, a shortage of light likely to occur in the corner can be effectively compensated for. Therefore, uneven brightness is reduced more favorably.

The end LED group 29 includes at least a pair of LED groups 25A and 25I, each located at either outermost end in the column direction of the bottom plate 14a. Thus, a light shortage in respective corners at both ends in the column direction of the bottom plate 14a is effectively compensated for. Therefore, dark areas are unlikely to be formed and uneven brightness is reduced more favorably.

The pair of LED groups 25A and 25I included in the end LED group 29 are driven to have substantially the same brightness. This way, the pair of LED groups 25A and 25I included in the end LED group 29 supply substantially the same amount of light to the corners each located at either end in the column direction of the bottom plate 14a. Thus, there will hardly be any inconsistency in brightness between both ends in the column direction of the bottom plate 14a and thus uneven brightness is reduced more favorably.

The end LED group 29 includes at least the LED group 25A (25I) located at the outermost end in the column direction of the bottom plate 14a, as well as an LED group 25B (25H) adjacent thereto on the middle side, these LED groups 25A and 25B (25H and 25I) being driven to have substantially the same brightness. With this way, as the LED group 25A (25I) located closest to corners, and the LED group 25B (25H) adjacent thereto on the middle side, are included in the end LED group 29 having relatively higher brightness than the middle LED group 28, and as these LED groups 25A and 25B (25H and 25I) are driven to have substantially the same brightness, a light shortage in corners of the bottom plate 14a can be compensated for more effectively. Thus, there will hardly be any dark areas and uneven brightness can be reduced even more favorably.

The bottom plate 14a is divided into a first end section 14A in the column direction, a second end section 14B located opposite to the first end section in the column direction, and a middle section 14C located between the first end section 14A and the second end section 14B. The LED groups 25A and 25B, and 25H and 25I, arranged respectively in the first end section 14A and the second end section 14B, are assigned as the end LED group 29, while the LED groups 25C to 25G located in the middle section 14C are assigned as the middle LED group 28. The bottom plate 14a thus is divided into three sections, the first end section 14A, second end section 14B, and middle section 14C, and the light source drive controller is configured to control light of at least one of the end LED group 29 and the middle LED group 28 in accordance with these divisions of the bottom plate 14a. Therefore, the light adjusting control is made simple.

The LED groups 25A and 25B located in the first end section 14A, and the LED groups 25H and 25I located in the second end section 14B, together forming the end LED group 29, are driven to have substantially the same brightness. This way, there is hardly any inconsistency in brightness between the first end section 14A and the second end section 14B of the bottom plate 14a. Therefore, uneven brightness is reduced more favorably.

The LED drive controller 24 is configured to control light of only the middle LED group 28, of the end LED group 29 and the middle LED group 28. The light adjusting control is therefore simpler than that of a configuration where light control is performed to both of the end LED group 29 and the middle LED group 28.

The LEDs 17 are mounted on the LED boards 18 arranged along the bottom plate 14a. The LED boards 18 include wiring patterns 18c connecting a plurality of LEDs 17 in series to form the LED groups 25. The plurality of LEDs 17 arranged in the row direction is thus connected in series by the wiring patterns 18c. Thus, these LEDs 17 can all be turned on with substantially the same brightness. To increase the number of LEDs 17 near corners of the bottom plate 14a, for example, as conventionally done, an LED board specially designed to accommodate LEDs 17 mounted in a uneven distribution would have to be produced, which would lead to higher cost. In this regard, there is no need to employ the conventional technique, as the uneven brightness is reduced through light control of the LED groups 25 as described above in this embodiment. Therefore, general-purpose LED boards, with regularly spaced LEDs 17 arranged thereon, for example, can be used. This enables further cost reduction.

Each LED board 18 has an elongated shape extending along the row direction, and a plurality of such LED boards 18 is arranged parallel and spaced apart from each other in the column direction on the bottom plate 14a. With this configuration, as compared to mounting LEDs 17 arranged in the row and column directions all on one LED board, the area of LED board is reduced by the length taking up the space between adjacent LED boards 18 arranged parallel in the column direction. Thus, the material cost associated with the LED boards 18 is cut down and the production cost is reduced, and also the weight is reduced.

A plurality of LED boards 18 is arranged side by side in the row direction on the bottom plate 14a, and the connectors 18a are provided as connecting components electrically connecting the LED boards 18 arranged along the row direction. This makes the backlight unit 12 suitable for large size applications, as the LED boards 18 arranged side by side in the row direction are electrically connected to each other with the connectors 18a.

The LED groups 25 adjacent to each other in the column direction are substantially equally spaced apart from each other. This makes the distribution density of LEDs 17 in the surface of the bottom plate 14a generally uniform in the column direction. Therefore, the brightness uniformity of emitted light is made higher and there is hardly any uneven brightness.

The LED drive controller 24 includes the light control unit 26 outputting control signals for driving the end LED group 29 and the middle LED group 28 with respective predetermined brightness levels, and the LED driver 27 supplying drive voltage to each of the end LED group 29 and the middle LED group 28 based on the control signals output from the light control unit 26. In this way, with drive voltage being supplied from the LED driver 27 to each of the end LED group 29 and the middle LED group 28 based on the control signals output from light control unit 26, the end LED group 29 and the middle LED group 28 are suitably driven to have their respective predetermined brightness levels.

The light control unit 26 generates pulse signals as the control signals, and the LED driver 27 is configured to drive the end LED group 29 and the middle LED group 28 based on the pulse signals with different ratios between the ON time and the OFF time. This light control according to a so-called PWM light control method enables light control in a wider range. Therefore, the LED groups 25 can be driven more suitably to reduce uneven brightness.

The light sources are LEDs 17. There are thus the advantages of high brightness and low power consumption.

On the light exit side of the LEDs 17 are arranged the diffuser lenses 19 diffusing light from the LEDs 17. Thus the light emitted from the LEDs 17 is diffused by the diffuser lenses 19 before exiting. This reduces the likeliness of unevenness occurring in exiting light, and the number of LEDs 17 to be installed can be decreased, which leads to cost reduction.

The liquid crystal display device 10 according to this embodiment includes the backlight unit 12 described above and the liquid crystal panel 11 as a display panel displaying images using light from the backlight unit 12. Since the backlight unit 12 that supplies light to the liquid crystal panel 11 is configured to reduce uneven brightness at low cost, the liquid crystal display device 10 can display high-quality images at low cost.

The display panel is the liquid crystal panel 11 formed by a pair of substrates with liquid crystal sealed therebetween. Such display panel is suitable for various applications such as TV or PC displays and particularly suited for use as large screen displays.

The LED drive controller 24 controls light of at least one of the middle LED group 28 and the end LED group 29 in accordance with the image display mode associated with the images displayed on the liquid crystal panel 11. This light control of LED groups 25 in accordance with the image display mode enables appropriate display of images on the liquid crystal panel 11 with a matching image display mode.

The image display mode includes a first image display mode giving priority at least to brightness uniformity and the second image display mode giving priority to high brightness. In the first image display mode, the LED drive controller 24 controls light of at least one of the middle LED group 28 and the end LED group 29 such that the end LED group 29 has relatively high brightness and the middle LED group 28 has relatively low brightness. In the second image display mode, the LED drive controller 24 controls light of at least one of the middle LED group 28 and the end LED group 29 such that the end LED group 29 and the middle LED group 28 have equal brightness. In the first image display mode, therefore, as the end LED group 29 has relatively high brightness and the middle LED group 28 has relatively low brightness, the brightness uniformity of the image displayed on the liquid crystal panel 11 can be made high. Accordingly, the first image display mode is favorable in usage environments where images are desired to be displayed on the liquid crystal panel 11 with high presentation quality, for example in dark rooms, and particularly suitable for watching films. On the other hand, in the second image display mode, as the end LED group 29 and the middle LED group 28 have equal brightness, images can be displayed on the liquid crystal panel 11 with high brightness. Therefore, the second image display mode is favorable in usage environments where high brightness is desired, for example, in bright rooms or outdoors.

In the second image display mode, the LED drive controller 24 controls light such that the middle LED group 28 has substantially the same brightness as that of the end LED group 29 in the first image display mode. In the second image display mode, therefore, both the end LED group 29 and the middle LED group 28 have substantially the same brightness as the relatively high brightness of the end LED group 29 in the first image display mode. Therefore, a higher level of brightness than the first image display mode is achieved. When switching between the first and second image display modes, light control needs to be performed only to the middle LED group 28 and not to the end LED group 29. Thus the light adjusting control is made simple.

While the first embodiment of the present invention has been described above, the present invention is not limited to the above-described embodiment, and may include, for example, the following modifications. Elements in the following respective modifications same as or similar to those of the previously described embodiment are given the same reference numerals as those of the previous embodiment, and may not be illustrated nor described again.

First Modification of the First Embodiment

A first modification of the first embodiment will be described with reference to FIGS. 15 and 16. One example is shown here, where the respective numbers of LED groups 25 contained in the end LED group 29 and the middle LED group 28 are changed.

Figure 15:
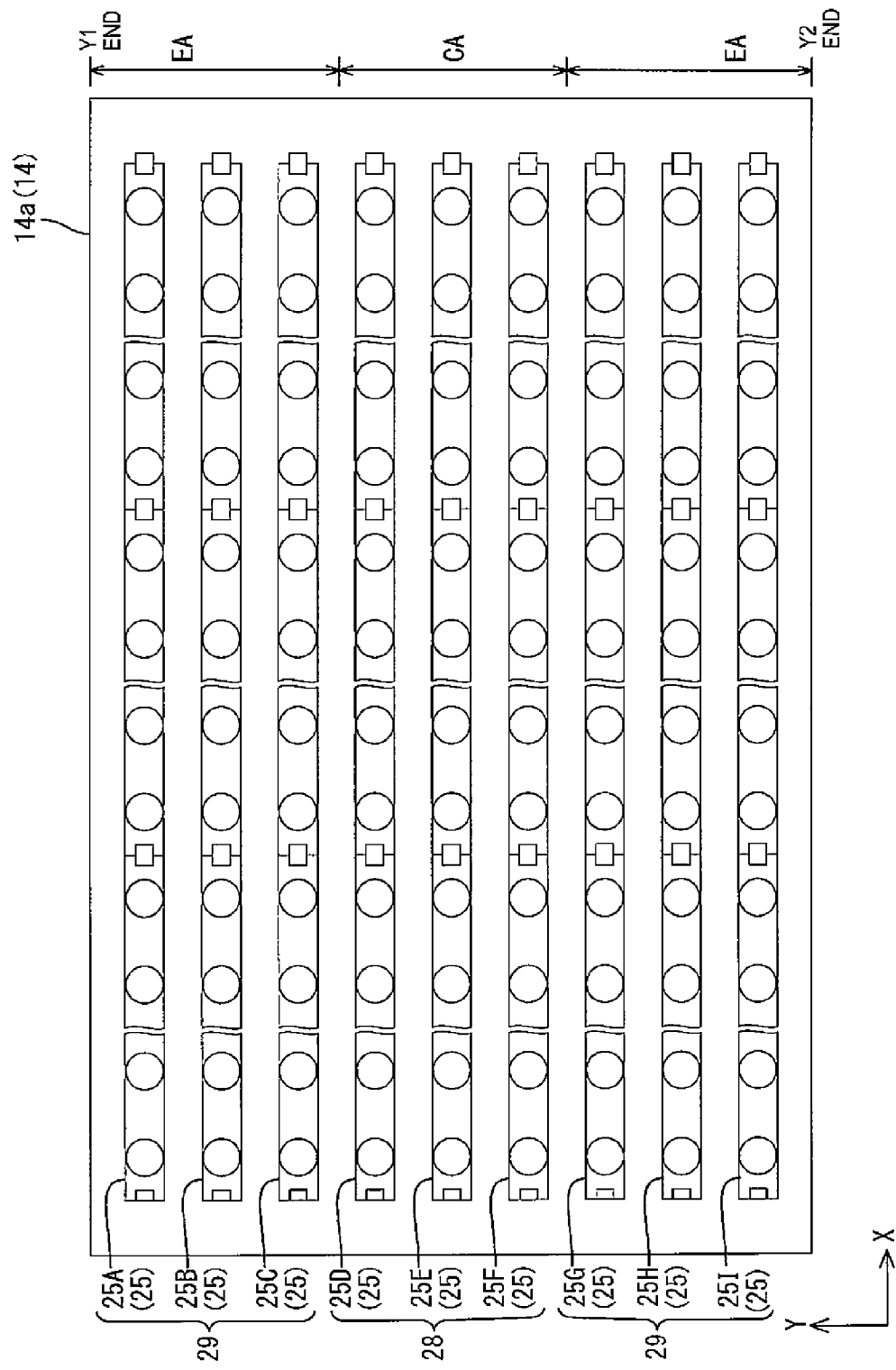
FIG. 15 is a schematic plan view illustrating the configuration layout of the LED groups (and respective LED boards) in the chassis according to a first modification of the first embodiment.
Figure 16:
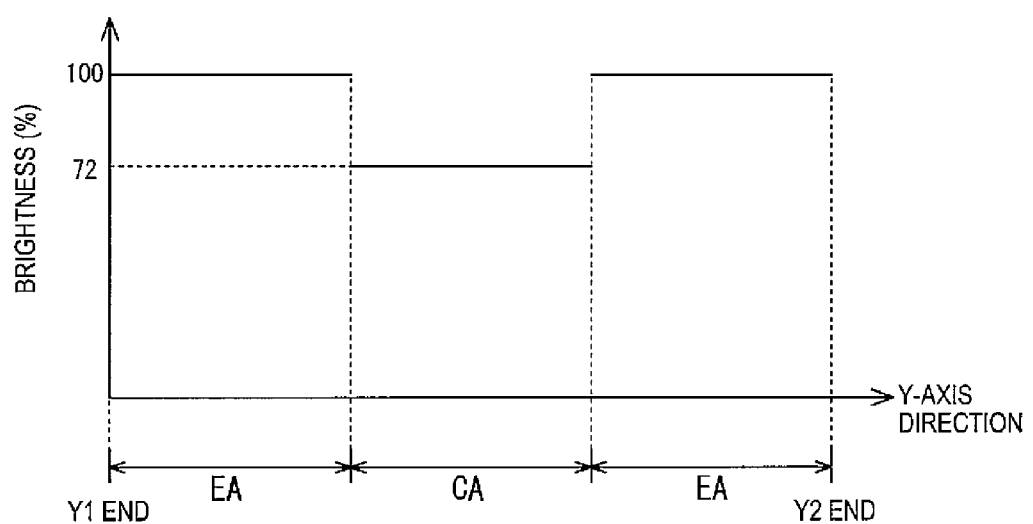
FIG. 16 is a graph showing changes in brightness of light emitted from the LED groups in the short side direction (column direction) of the chassis in the first image display mode.

In this modification, the end LED group 29 includes three each LED groups 25A to 25C and 25G to 25I located at either end in the column direction (Y-axis direction) of the bottom plate 14a of the chassis 14, while the middle LED group 28 includes three LED groups 25D to 25F located on the middle side in the column direction of the bottom plate 14a, as shown in FIG. 15. More specifically, the end LED group 29 includes the first LED group 25A, the second LED group 25B, the third LED group 25C, the seventh LED group 25G, the eighth LED group 25H, and the ninth LED group 25I, while the middle LED group 28 includes the fourth LED group 25D, the fifth LED group 25E, and the sixth LED group 25F. Therefore, the bottom plate 14a of the chassis 14 has one third region each at either end in the short side direction (column direction, Y-axis direction) as end LED group areas EA where the groups of the end LED group 29 are located, and one third region in the center as a middle LED group area CA where the middle LED group 28 is located. This configuration has a wider area of high brightness in the first image display mode as shown in FIG. 16 as compared to the previously described first embodiment, because the number of groups in the middle LED group 28 is reduced and the number of groups in the end LED group 29 is increased. This configuration is therefore suitable for applications where even higher brightness is desired in the first image display mode, and also favorably eliminates any dark areas in corners.

Second Modification of the First Embodiment

Figure 17:
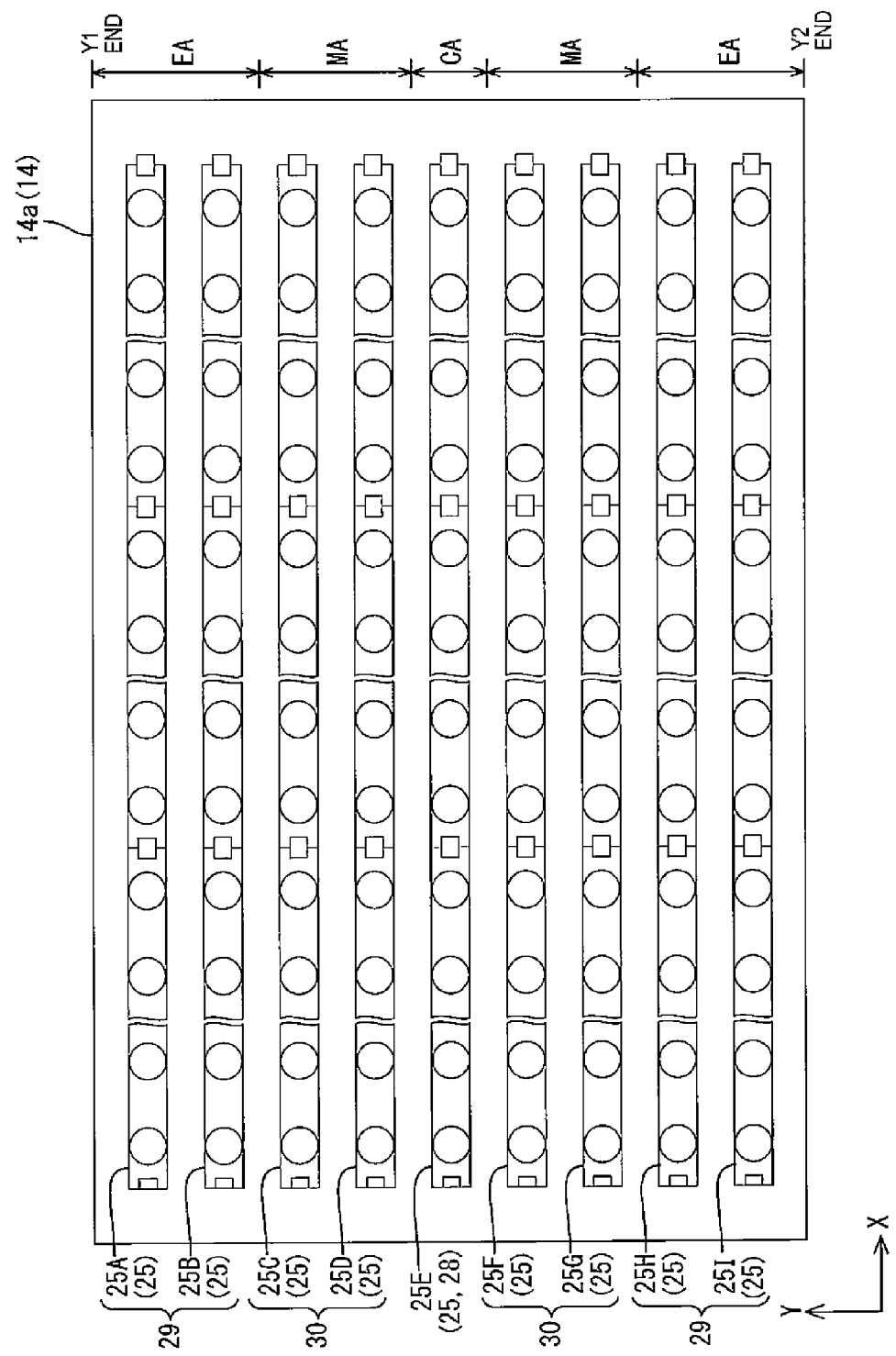
FIG. 17 is a schematic plan view illustrating the configuration layout of the LED groups (and respective LED boards) in the chassis according to a second modification of the first embodiment.

A second modification of the first embodiment will be described with reference to FIGS. 17 and 18. One example is shown here where the LED groups 25 inside the chassis 14 are driven to have three levels of brightness.

In this modification, the LED groups 25 arranged in the chassis 14 are divided into three groups, the end LED group 29, the middle LED group 28, and a middle LED group 30 located between the end and middle LED groups 29 and 28, each being controlled to have predetermined brightness. More specifically, the end LED group 29 includes, as shown in FIG. 17, two each LED groups 25 located at either end in the column direction (Y-axis direction) of the bottom plate 14a of the chassis 14 (first LED group 25A, second LED group 25B, eighth LED group 25H, and ninth LED group 25I), while the middle LED group 28 includes one LED group 25 (fifth LED group 25E) located at the center position in the column direction of the bottom plate 14a. The middle LED group 30 includes two LED groups 25 (fourth LED group 25D and sixth LED group 25F) adjacent on both sides in the column direction to the middle LED group 28 (fifth LED group 25E), and LED groups 25 (third LED group 25C and seventh LED group 25G) adjacent on the middle side in the column direction to the end LED group 29 (second LED group 25B and eighth LED group 25H). The respective LED groups 25C, 25D, 25F, and 25G included in the middle LED group 30 are all driven to have the same brightness as with the middle LED group 28 and the end LED group 29. The regions where the groups of the end LED group 29 are located on the bottom plate 14a of the chassis 14 are end LED group areas EA, the region where the middle LED group 28 is located is a middle LED group area CA, and the regions where the groups of the middle LED group 30 are located are middle LED group areas MA.

Figure 18:
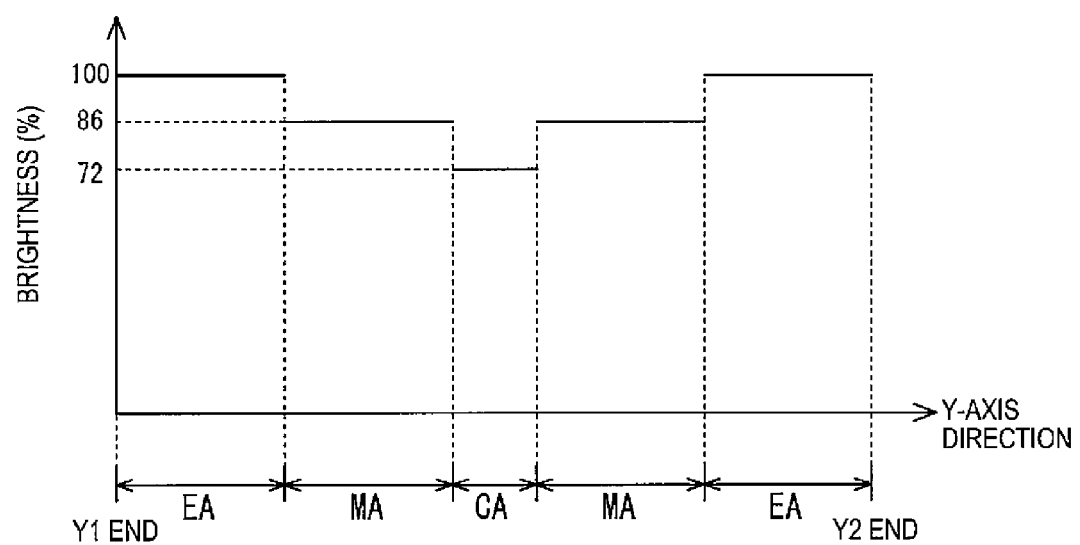
FIG. 18 is a graph showing changes in brightness of light emitted from the LED groups in the short side direction (column direction) of the chassis in the first image display mode.

In the first image display mode, as shown in FIG. 18, the middle LED group 30 (middle LED group areas MA) is driven to have brightness (of, for example, 86%) that is relatively lower than the brightness (of, for example, 100%) of the end LED group (end LED group areas EA) and relatively higher than the brightness (of, for example, 72%) of the middle LED group 28 (middle LED group area CA). In other words, the LED groups 25 are controlled to emit light with brightness increasing from the center toward both ends in the column direction of the bottom plate 14a. As the image display modes are switched, the LED drive controller 24 controls light of the middle LED group 28 and the middle LED group 30, and not the end LED group 29. As the LED groups 25 are driven to have three levels of brightness in this modification, the brightness uniformity of emitted light on the display surface can be made even higher as compared to the previously described first embodiment with two-level control. Moreover, as the middle LED group 28, the end LED group 29, and the middle LED group 30 are arranged symmetrically in the column direction (Y-axis direction) on the bottom plate 14a of the chassis 14 in this modification, the brightness distribution on the display surface in the first image display mode will be symmetrical around the center position in the column direction, whereby even higher uniformity is achieved. The middle LED group 30 could also be regarded as the "end LED group", as its LED groups are located closer to the ends in the column direction of the bottom plate 14a relative to the middle LED group 28. Contrarily, the middle LED group 30 could also be regarded as the "middle LED group" relative to the end LED group 29, as its LED groups are located closer to the center of the bottom plate 14a in the column direction than the end LED group 29.

As described above, with this modification, the LED drive controller 24 is configured to control light of the respective LED groups 25 arranged in the column direction such that the brightness increases from the center toward an end in the column direction of the bottom plate 14a. As the LED groups 25 are controlled to emit light with brightness increasing from the center toward the end of the bottom plate 14a in the column direction, the brightness uniformity of emitted light in the surface of the bottom plate 14a is made even higher, making any uneven brightness even less likely to occur.

The LED drive controller 24 is configured to control light of the respective LED groups 25 arranged in the column direction such that the brightness increases from the center each toward either end in the column direction of the bottom plate 14a. As the LED groups 25 are controlled to emit light with brightness increasing from the center toward both ends of the bottom plate 14a in the column direction, the brightness uniformity of emitted light in the surface of the bottom plate 14a is made even higher, making any uneven brightness even less likely to occur.

The LED drive controller 24 is configured to control light of the respective LED groups 25 arranged in the column direction such that the brightness is linearly symmetrical about a line passing through the center in the column direction of the bottom plate 14a and extending along the row direction. This way, the brightness uniformity in the surface of the bottom plate 14a is made even higher, making any uneven brightness even less likely to occur.

Third Modification of the First Embodiment

Figure 19:
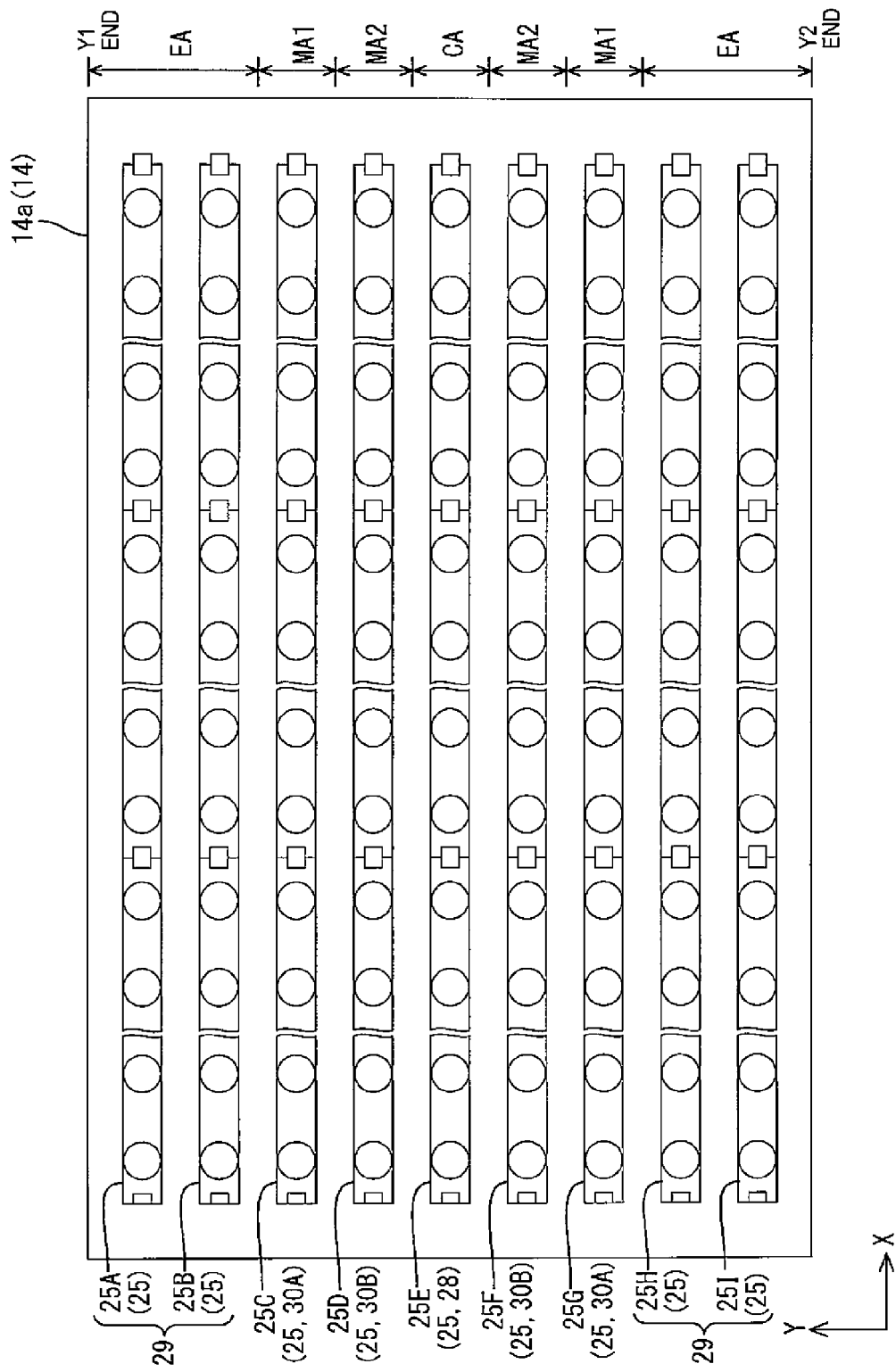
FIG. 19 is a schematic plan view illustrating the configuration layout of the LED groups (and respective LED boards) in the chassis according to a third modification of the first embodiment.

A third modification of the first embodiment will be described with reference to FIGS. 19 and 20. One example is shown here where the LED groups 25 inside the chassis 14 are driven to have four levels of brightness.

In this modification, the middle LED group 30 mentioned in the description of the second modification is divided into a first middle LED group 30A and a second middle LED group 30B that can be driven to have different brightness from each other. The first middle LED group 30A is located closer to the end in the column direction of the bottom plate 14a, while the second middle LED group 30B is located closer to the center in the column direction of the bottom plate 14a. More specifically, the end LED group 29 includes, as shown in FIG. 19, two each LED groups 25 located at either end in the column direction (Y-axis direction) of the bottom plate 14a of the chassis 14 (first LED group 25A, second LED group 25B, eighth LED group 25H, and ninth LED group 25I), while the middle LED group 28 includes one LED group 25 (fifth LED group 25E) located at the center position in the column direction of the bottom plate 14a. The first middle LED group 30A includes LED groups 25 (third LED group 25C and seventh LED group 25G) adjacent on the middle side in the column direction to the end LED group 29 (second LED group 25B and eighth LED group 25H), while the second middle LED group 30B includes two LED groups 25 (fourth LED group 25D and sixth LED group 25F) adjacent on both sides in the column direction to the middle LED group 28 (fifth LED group 25E). The regions where the groups of the end LED group 29 are located on the bottom plate 14a of the chassis 14 are end LED group areas EA, the region where the middle LED group 28 is located is a middle LED group area CA, the regions where the groups of the first middle LED group 30A are located are middle LED group areas MA1, and the regions where the groups of the second middle LED group 30B are located are middle LED group areas MA2.

Figure 20:
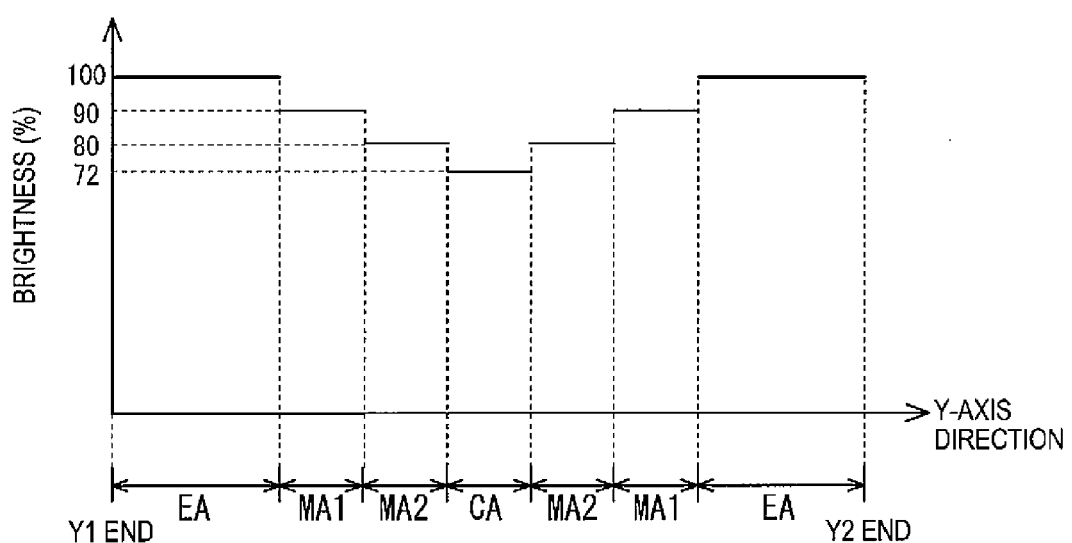
FIG. 20 is a graph showing changes in brightness of light emitted from the LED groups in the short side direction (column direction) of the chassis in the first image display mode.

In the first image display mode, as shown in FIG. 20, the first middle LED group 30A is driven to have brightness (of, for example, 90%) that is relatively lower than the brightness (of, for example, 100%) of the end LED group 29, while the second middle LED group 30B is driven to have brightness (of, for example, 80%) that is relatively lower than that of the first middle LED group 30A but higher than the brightness (of, for example, 72%) of the middle LED group 28. As the image display modes are switched, the LED drive controller 24 controls light of the middle LED group 28, the first middle LED group 30A, and the second middle LED group 30B, and not the end LED group 29. As the LED groups are driven to have four levels of brightness in this modification, the brightness uniformity of emitted light on the display surface can be made even higher as compared to the previously described second modification with three-level control. In this modification, too, as with the previously described second modification, the brightness distribution is symmetrical on the display surface in the first image display mode.

Fourth Modification of the First Embodiment

Figure 21:
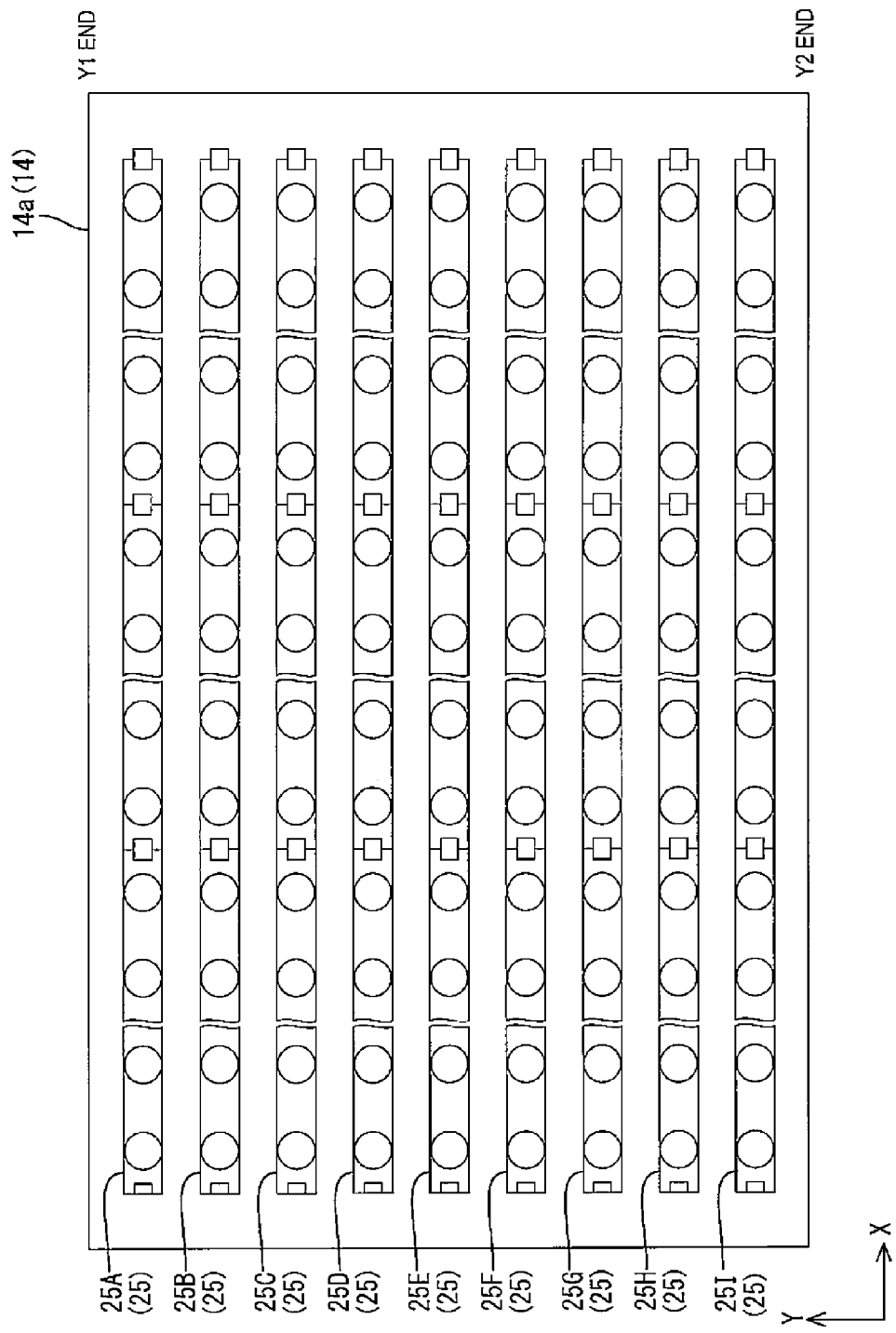
FIG. 21 is a schematic plan view illustrating the configuration layout of the LED groups (and respective LED boards) in the chassis according to a fourth modification of the first embodiment.
Figure 22:
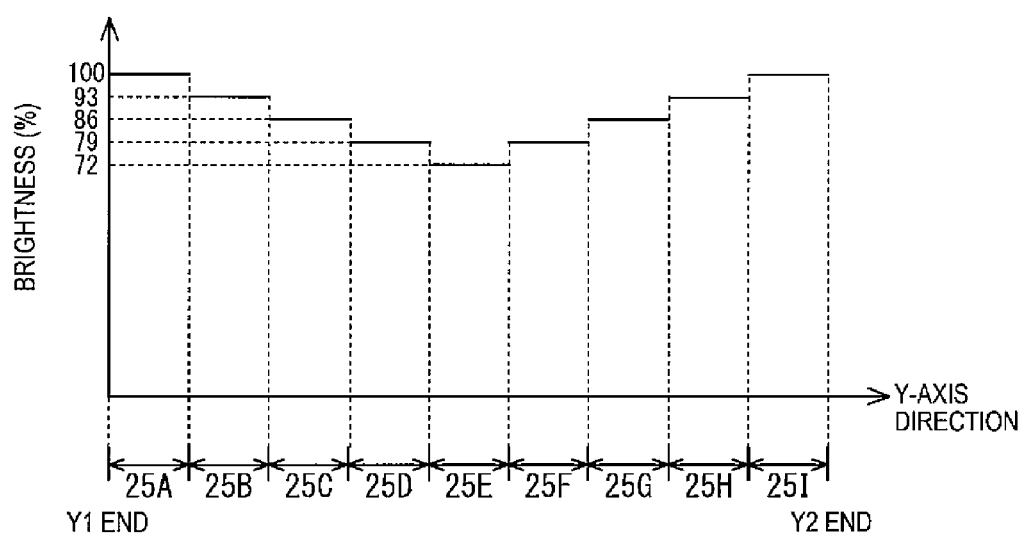
FIG. 22 is a graph showing changes in brightness of light emitted from the LED groups in the short side direction (column direction) of the chassis in the first image display mode.

A fourth modification of the first embodiment will be described with reference to FIGS. 21 and 22. One example is shown here where every LED group 25 has a different brightness level.

In this modification, all the LED groups 25 have different brightness levels that are controlled to increase from the center toward ends in the column direction of the bottom plate 14a of the chassis 14. More specifically, in the first image display mode, as shown in FIGS. 21 and 22, of the LED groups 25, the first LED group 25A and the ninth LED group 25I located at either end position in the column direction of the bottom plate 14a are driven to have maximum brightness (of, for example, 100%), the second LED group 25B and the eighth LED group 25H adjacent thereto on the middle side are driven to have lower brightness (of, for example, 93%), and likewise, sequentially, the third LED group 25C and the seventh LED group 25G have brightness of, for example, 86%, the fourth LED group 25D and the sixth LED group 25F have brightness of, for example, 79%, and the fifth LED group 25E at the center position is controlled to have minimum brightness (of, for example, 72%). Namely, the brightness of the LED groups 25 arranged in the column direction is made higher as the distance from the center position in the column direction of the bottom plate 14a increases, and lower as the distance decreases, i.e., the brightness is made proportional to the distance from the center. As the LED groups 25 are individually driven to have different brightness, at five levels, in this modification, the brightness uniformity of emitted light on the display surface can be made even higher as compared to the previously described third modification with four-level control. As the image display modes are switched, the LED drive controller 24 does not control light of the first LED group 25A and the ninth LED group 25I having maximum brightness in the first image display mode, but controls light of other LED groups, from the second LED group 25B to the eighth LED group 25H.

As described above, with this modification, the LED drive controller 24 is configured to control light of the respective LED groups 25 arranged in the column direction such that the brightness increases proportionally in accordance with the distance from the center in the column direction of the bottom plate 14a. As the brightness of the LED groups 25 is controlled to increase proportionally in accordance with the distance from the center in the column direction of the bottom plate 14a, the brightness uniformity in the surface of the bottom plate 14a is made even higher, which is even more preferable for reducing uneven brightness.

Second Embodiment

A second embodiment of the present invention will be described with reference to FIG. 23. The configuration shown in this second embodiment has different array pitches between the LED groups 25 in the column direction. The structures and advantageous effects similar to those of the previously described first embodiment will not be repeated again.

Figure 23:
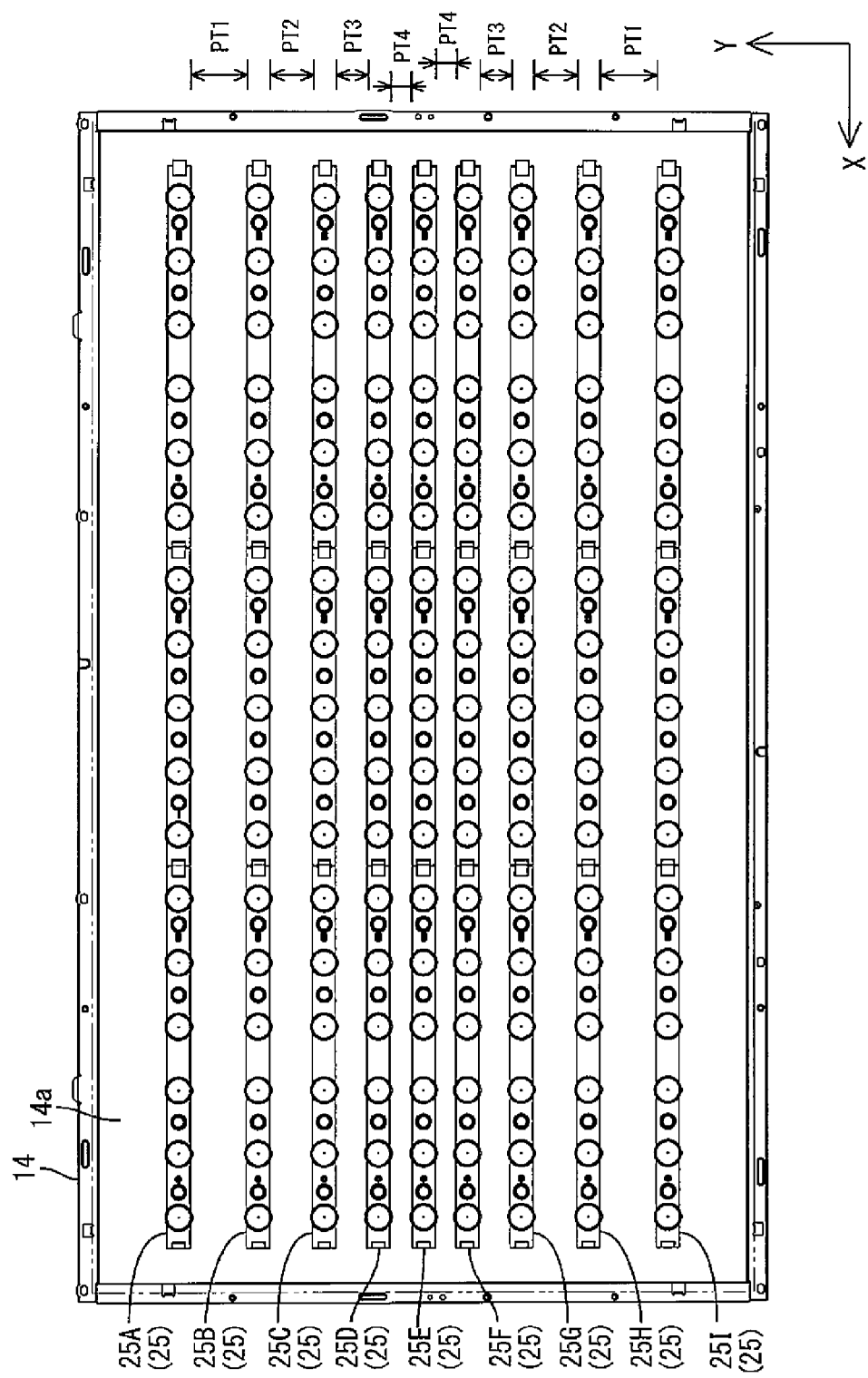
FIG. 23 is a plan view illustrating the configuration layout of the LED groups (and respective LED boards) in the chassis according to a second embodiment of the present invention.

The array pitch, or distance between the LED groups adjacent to each other in the column direction (Y-axis direction), is relatively short on the middle side and relatively long at both ends in the column direction on the bottom plate 14a of the chassis 14 as shown in FIG. 23. More particularly, the distance between the LED groups 25 adjacent to each other in the column direction is the longest (PT1) between the first LED group 25A (ninth LED group 25I) arranged at an outermost end in the column direction of the bottom plate 14a of the chassis 14 and the second LED group 25B (eighth LED group 25H) adjacent thereto on the middle side. The distance PT2 between the second LED group 25B (eighth LED group 25H) and the third LED group 25C (seventh LED group 25G) adjacent thereto on the middle side, and the distance PT3 between the third LED group 25C (seventh LED group 25G) and the fourth LED group 25D (sixth LED group 25F) adjacent thereto on the middle side are progressively shorter than PT1, and the distance PT4 between the fifth LED group 25E arranged at the center position and the fourth LED group 25D and the sixth LED group 25F adjacent thereto on both sides is the shortest. Namely, the distance between the LED groups 25 adjacent to each other in the column direction is increased gradually from the middle side toward both ends in the column direction of the bottom plate 14a, or conversely, decreased gradually from both sides toward the middle side. The LED groups 25 are thus arranged linearly symmetrical about a symmetrical axis passing through the center position in the column direction and extending along the row direction (X-axis direction).

With the LED groups 25 arrayed in this manner, as compared to the first embodiment, the installation density of LEDs 17 is higher on the middle side in the column direction of the bottom plate 14a. Therefore, the brightness in the display surface can be made even higher. On the other hand, as compared to the first embodiment, there is a higher possibility that dark areas may be created in corners since the installation density of LEDs 17 is lower at both ends in the column direction of the bottom plate 14a. However, since the LED groups 25 are driven at different brightness levels, relatively high for the end LED group 29 and relatively low for the middle LED group 28 in the first image display mode, dark areas are less likely to be formed in corners of the bottom plate 14a even though the LED groups 25 are arranged with unequal pitches as in this embodiment. Therefore, the brightness uniformity can be made high. The LED groups 25 in this embodiment may be grouped into the end LED group 29 and the middle LED group 28 (and middle LED group) suitably by any of the techniques described in the first embodiment and its modification described in the foregoing.

With this embodiment, as described above, the distance between the LED groups 25 adjacent to each other in the column direction is shorter on the middle side than at ends in the column direction of the bottom plate 14a. With the LED groups 25 arranged in this way, the density of LEDs 17 is lower at ends in the column direction of the bottom plate 14a. Therefore, there is a higher possibility that dark areas may be created in corners. However, in this embodiment, since the end LED group 29 is controlled to have relatively higher brightness than the middle LED group 28, any light shortage in corners can be favorably resolved, making possible to reduce uneven brightness.

Third Embodiment

Figure 24:
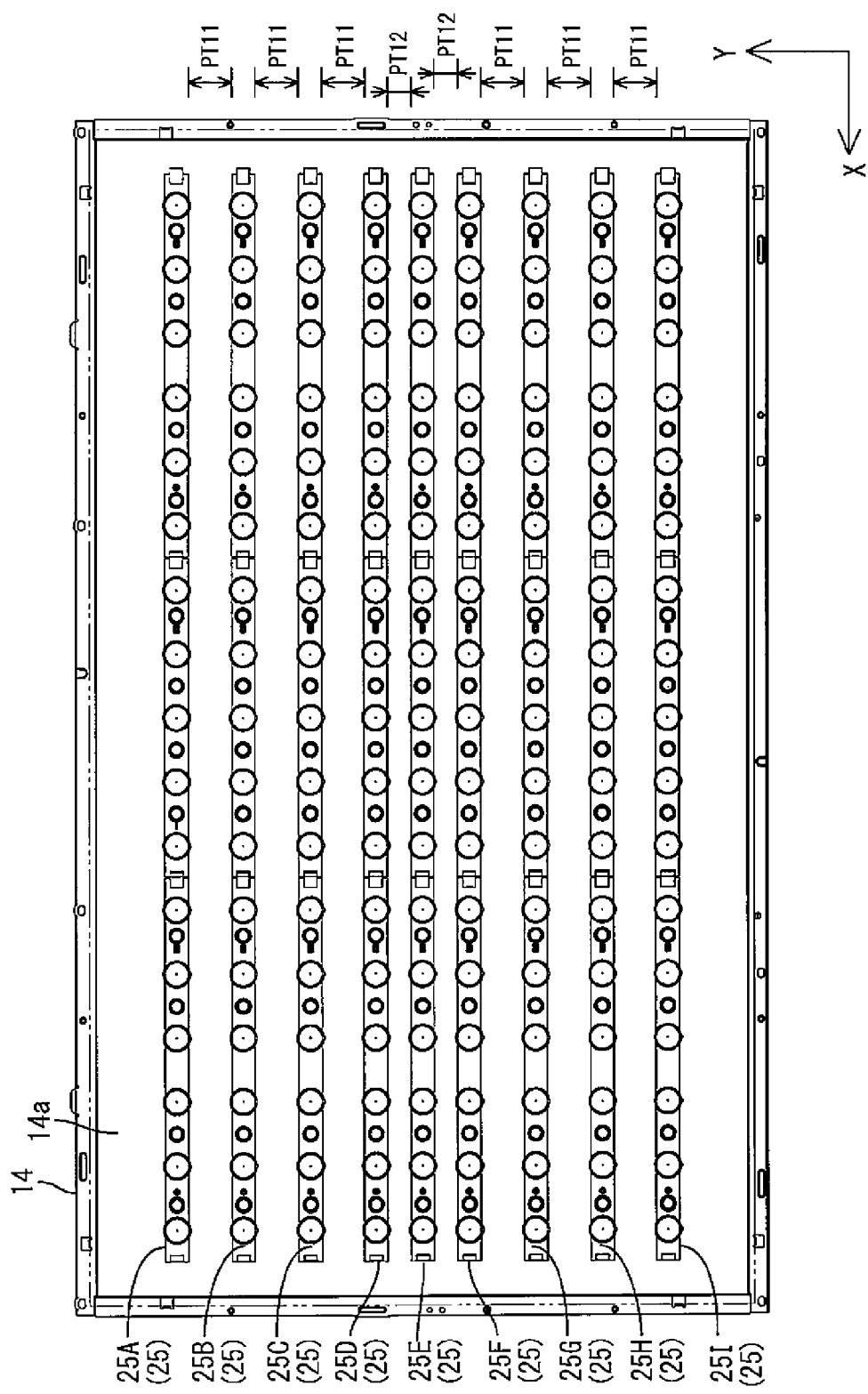
FIG. 24 is a plan view illustrating the configuration layout of the LED groups (and respective LED boards) in the chassis according to a third embodiment of the present invention.

A third embodiment of the present invention will be described with reference to FIG. 24. The configuration shown in the third embodiment is different from that of the second embodiment in the array pitch between adjacent LED groups 25 in the column direction. The structures and advantageous effects similar to those of the previously described second embodiment will not be repeated again.

Here, there are two different distances, or array pitches, between the LED groups 25 adjacent to each other in the column direction (Y-axis direction), a relatively short one on the middle side and a relatively long one at both ends in the column direction on the bottom plate 14a of the chassis 14 as shown in FIG. 23. More specifically, the distance between the three LED groups 25 arranged on the middle side in the column direction of the bottom plate 14a is relatively short, and the distance between the three LED groups 25 arranged at both ends is relatively long. More particularly, the distance PT11 between the first LED group 25A (ninth LED group 25I) arranged at an outermost end in the column direction of the bottom plate 14a and the second LED group 25B (eighth LED group 25H) adjacent thereto on the middle side is substantially equal to the distance PT11 between the second LED group 25B (eighth LED group 25H) and the third LED group 25C (seventh LED group 25G) adjacent thereto on the middle side, and to the distance PT11 between the third LED group 25C (seventh LED group 25G) and the fourth LED group 25D (sixth LED group 25F) adjacent thereto on the middle side, this distance PT11 being longer than the distance PT12 between the LED groups 25 on the middle side to be described next. On the other hand, the distance PT12 between the fifth LED group 25E arranged at the center position and the fourth LED group 25D and the sixth LED group 25F adjacent thereto on both sides is substantially equal, the distance PT12 being shorter than the distance PT11 between the LED groups 25 at the ends described above. With the LED groups 25 arranged with just two different distances PT11 and PT12 therebetween in this manner, the respective LED boards 18 can be disposed more easily. The LED groups 25 are arranged linearly symmetrical about a symmetrical axis passing through the center position in the column direction and extending along the row direction (X-axis direction). The LED groups 25 in this embodiment may be grouped into the end LED group 29 and the middle LED group 28 (and middle LED group) suitably by any of the techniques described in the first embodiment and its modification described in the foregoing. Preferably, particularly in this embodiment, the LED groups 25 may be grouped into three, each with three rows as in the first modification, corresponding to the arrangement of the LED groups 25 on the bottom plate 14a in this embodiment.

Other Embodiment

The present invention is not limited to the above embodiments explained in the above description. The following embodiments may be included in the technical scope of the present invention, for example.

(1) The LED groups may be variously grouped as the end LED group and the middle LED group as required other than the way shown in the first modification of the first embodiment described above. For example, four each groups, the first LED group 25A to the fourth LED group 25D and the sixth LED group 25F to the ninth LED group 25I, may be included in the end LED group 29, and only the fifth LED group 25E at the center position in the column direction may be included in the middle LED group 28. Alternatively, one each group at either outermost end in the column direction, the first LED group 25A and the ninth LED group 25I, may be included in the end LED group 29, and the other seven groups, the second LED group 25B to the eighth LED group 25H, may be included in the middle LED group 28.

(2) The LED groups may be variously grouped as the end LED group, the middle LED group, and the middle LED group as required other than the way shown in the second modification of the first embodiment described above. For example, the first LED group 25A, the second LED group 25B, the eighth LED group 25H, and the ninth LED group 25I may be included in the end LED group 29, the third LED group 25C and the seventh LED group 25G may be included in the middle LED group 30, and the fourth LED group 25D to the sixth LED group 25F may be included in the middle LED group 28. Alternatively, the first LED group 25A to the third LED group 25C and the seventh LED group 25G to the ninth LED group 25I may be included in the end LED group 29, the fourth LED group 25D and the sixth LED group 25F may be included in the middle LED group 30, and the fifth LED group 25E may be included in the middle LED group 28. Alternatively, the first LED group 25A and the ninth LED group 25I may be included in the end LED group 29, the second LED group 25B to the fourth LED group 25D and the sixth LED group 25F to the eighth LED group 25H may be included in the middle LED group 30, and the fifth LED group 25E may be included in the middle LED group 28. Alternatively, the first LED group 25A and the ninth LED group 25I may be included in the end LED group 29, the second LED group 25B and the eighth LED group 25H may be included in the middle LED group 30, and the third LED group 25C to the seventh LED group G may be included in the middle LED group 28.

(3) The LED groups may be variously grouped as the end LED group, the first middle LED group, the second middle LED group, and the middle LED group as required other than the way shown in the third modification of the first embodiment described above. For example, the first LED group 25A and the ninth LED group 25I may be included in the end LED group 29, the second LED group 25B, the third LED group 25C, the seventh LED group 25G, and the eighth LED group 25H may be included in the first middle LED group 30A, the fourth LED group 25D and the sixth LED group 25F may be included in the second middle LED group 30B, and the fifth LED group 25E may be included in the middle LED group 28. Alternatively, the first LED group 25A and the ninth LED group 25I may be included in the end LED group 29, the second LED group 25B and the eighth LED group 25H may be included in the first middle LED group 30A, third LED group 25C, the fourth LED group 25D, the sixth LED group 25F, and the seventh LED group 25G may be included in the second middle LED group 30B, and the fifth LED group 25E may be included in the middle LED group 28. Alternatively, the first LED group 25A and the ninth LED group 25I may be included in the end LED group 29, the second LED group 25B and the eighth LED group 25H may be included in the first middle LED group 30A, the third LED group 25C and the seventh LED group 25G may be included in the second middle LED group 30B, and the fourth LED group 25D to the sixth LED group 25F may be included in the middle LED group 28.

(4) While the illustrated embodiments described above include nine LED groups arranged parallel in the column direction, the number of LED groups may be any number higher or lower than 9. The LED groups in respective cases may be included as required in the end LED group and the middle LED group (and middle LED group) as specified in the first embodiment and its modifications, and paragraphs (1) to (3) described above.

(5) While the end LED group with LED groups each arranged at either end in the column direction of the bottom plate is driven to have the same brightness in the first image display mode in various embodiments described above, the present invention includes other configurations where LED groups of the end LED group each arranged at either end are driven to have different brightness levels. In this case, too, the brightness of all the LED groups of the end LED group in the first image display mode is made relatively higher than the brightness of the middle LED group.

(6) While the LED groups arranged at outermost ends in the column direction of the bottom plate are assigned as the end LED group in various embodiments described above, the present invention includes other configurations where, for example, the outermost LED groups are driven to have the same brightness as that of the middle LED group while the LED groups adjacent thereto on the middle side are assigned and driven as the end LED group.

(7) While the LED groups are grouped such that the end LED group and the middle LED group (middle LED group) are arranged symmetrical about the symmetrical axis passing through the center position in the column direction in various embodiments described above, it is possible to group the LED groups such that at least one of the end LED group and the middle LED group (middle LED group) is arranged asymmetrical. In this case, for example, the LED group arranged at one end in the column direction may be assigned and driven as the end LED group, while the LED group arranged at the other end may be driven to have the same brightness as the middle LED group.

(8) While, when the image display modes are switched, light control is performed only to the middle LED group (and middle LED group) and not to the end LED group having the maximum brightness in the first image display mode in various embodiments described above, the present invention includes other configurations where, contrarily, light control is performed to the end LED group (and middle LED group) and not to the middle LED group having the minimum brightness in the first image display mode.

(9) In addition to the alternative mentioned in paragraph (8) above, light control may be performed to both the end LED group and the middle LED group (and middle LED group) when the image display modes are switched. More specifically, when the second image display mode is switched to the first image display mode, the brightness of the end LED group may be made higher and the brightness of the middle LED group may be made lower. When the first image display mode is switched to the second image display mode, the brightness of the end LED group may be made lower and the brightness of the middle LED group may be made higher. If there is assigned a middle LED group such that the first image display mode has three or more levels of brightness, there could be both configurations where light control is not performed to the middle LED group and where light control is performed to the middle LED group when the image display modes are switched.

(10) While the brightness of the LED groups in the first image display mode is increased gradually from the middle side toward both ends in the column direction in various embodiments described above, there could be configurations where the brightness of the LED groups is decreased somewhere halfway between the center and the ends.

(11) While the LEDs are arranged side by side in the row direction at a substantially equal array pitch in various embodiments described above, it is possible to arrange the LEDs at different array pitches side by side in the row direction.

(12) While the respective LED groups of each row include the same number of LEDs (number of LEDs arranged side by side in the row direction) in various embodiments described above, each row of LED groups may include different numbers of LEDs.

(13) While three LED boards are arranged side by side in the row direction and connected to each other by connectors in various embodiments described above, the number of LED boards arranged side by side in the row direction may be changed as required to one, two, or four or more.

(14) While LED boards are divided to respective rows in various embodiments described above, the present invention includes other configurations having LED boards arranged to cover a plurality of rows, namely, one LED board carrying LEDs belonging to a plurality of rows adjacent to each other. In this case, there could also be a configuration where the chassis has only one LED board, with all the LEDs mounted on that LED board.

(15) While the LED boards have an elongated shape with their long side direction aligned with the X-axis direction and their short side direction aligned with the Y-axis direction in various embodiments described above, the present invention includes other configurations where the LED boards have an elongated shape with their long side direction aligned with the Y-axis direction and their short side direction aligned with the X-axis direction. In this case, the Y-axis direction will be the row direction while the X-axis direction will be the column direction. LEDs arranged on the LED boards located at an end in the X-axis direction on the bottom plate of the chassis may be assigned and driven as the end LED group, while LEDs arranged on the LED boards located on a middle side in the X-axis direction may be assigned and driven as the middle LED group.

(16) While the LED drive controller performs PWM light control to the LED groups in various embodiments described above, the present invention includes other configurations where the LED drive controller adopts a so-called voltage control method to control light by varying the voltage applied to the LED groups.

(17) While the liquid crystal display device illustrated in various embodiments described above includes two image display modes, the first image display mode giving priority to brightness uniformity and the second image display mode giving priority to high brightness, the present invention includes other devices having other image display modes other than these two image display modes.

(18) While the bottom plate of the chassis is rectangular in various embodiments described above, the present invention includes other configurations where the bottom plate is square.

(19) While LEDs are used as point light sources in various embodiments described above, other types of point light sources may also be used.

(20) Light sources other than those in various embodiments described above may also be used, including linear light sources such as cold cathode tubes or hot cathode tubes, and surface light sources such as an organic EL. In short, any light sources are applicable as long as they are arranged in rows on the bottom plate of the chassis.

(21) While the device includes diffuser lenses for diffusing light from the LEDs in various embodiments described above, the diffuser lenses may be changed to other optical lenses, or the diffuser lenses may be omitted.

(22) While the liquid crystal display device uses TFTs as switching components in various embodiments described above, the present invention is applicable also to liquid crystal display devices using other types of switching components (for example TFDs (Thin Film Diodes)). The invention is applicable not only to color liquid crystal display devices but also monochrome liquid crystal display devices.

(23) While the liquid crystal display device uses a liquid crystal panel as the display panel in various embodiments described above, the present invention is applicable also to display devices using other types of display panels.

(24) While the television receiver includes a tuner in various embodiments described above, the present invention is applicable also to display devices without a tuner.

EXPLANATION OF SYMBOLS

10: Liquid crystal display device (Display device)
11: Liquid crystal panel (Display panel)
12: Backlight unit (Lighting device)
14: Chassis
14a: Bottom plate (Bottom part)
14A: First end section
14B: Second end section
14C: Middle section
17: LED (Light source)
18: LED board
18a: Connector (Connecting component)
18c: Wiring pattern
19: Diffuser lens
24: LED drive controller (Light source drive controller)
25: LED group (Light source group)
26: Light control unit
27: LED driver (Light source driver)
28: Middle LED group (Middle light source group)
29: End LED group (End light source group)
30: Middle LED group (Middle light source group, end light source group)
30A: First middle LED group (Middle light source group, end light source group)
30B: Second middle LED group (Middle light source group, end light source group)
TV: Television receiver

The invention claimed is:
1. A display device comprising:
a lighting device including:
    a plurality of light sources;
    a chassis including a bottom part having a rectangular plan view shape and configured to house the light sources; and
    a light source drive controller configured to control drive of the light sources; and
a display panel configured to display images using light from the lighting device,
wherein:
    the light sources are arranged in a matrix in row and column directions along the bottom part;
    the light sources that are arranged in the row direction configure a light source group and the light source group includes a plurality of light source groups arranged in the column direction;
    the light source groups include a middle light source group and an end side light source group and the middle light source group includes the light source groups arranged in a middle portion of the bottom part in the column direction and the end side light source group includes the light source groups arranged close to an end side of the bottom part in the column direction;
    the light source drive controller is configured to control light of at least one of the middle light source group and the end side light source group in accordance with an image display mode;

the light source drive controller is configured to switch the image display mode between a first image display mode having brightness uniformity and a second image display mode having higher brightness than that of the first image display mode;

in the first image display mode, the light source drive controller is configured to control light of at least one of the middle light source group and the end side light source group such that the end side light source group has relatively high brightness and the middle light source group has relatively low brightness;

in the first image display mode, the light source drive controller is configured to control the middle light source group such that an ON time is shorter and an OFF time is longer than the ON time and the OFF time of the middle light source group in the second image display mode; and in the second image display mode, the light source drive controller is configured to control light of at least one of the middle light source group and the end side light source group such that the end side light source group and the middle light source group have equal brightness and a ratio between the ON time and the OFF time of the middle light source group and a ratio between an ON time and an OFF time of the end side light source group are equal.

2. The lighting device according to claim 1, wherein the end side light source group includes at least one of the light source groups that is located close to an outermost end of the bottom part in the column direction.

3. The lighting device according to claim 2, wherein the end side light source group includes at least a pair of light source groups each of which is located close to each outermost end of the bottom part in the column direction.

4. The lighting device according to claim 3, wherein the pair of light source groups included in the end side light source group are driven to have substantially equal brightness.

5. The lighting device according to claim 2, wherein:
the end side light source group includes at least the light source group located close to the outermost end of the bottom part in the column direction and a light source group adjacent to the at least the light source group on a side close to the middle portion of the bottom part; and
the at least the light source group and the adjacent light source group are driven to have substantially equal brightness.

6. The lighting device according to claim 1, wherein:
the bottom part is defined into a first end section in the column direction, a second end section located opposite to the first end section in the column direction, and a middle section provided between the first end section and the second end section; and
the light source group provided in each of the first end section and the second end section is the end side light source group, and the light source group provided in the middle section is the middle light source group.

7. The lighting device according to claim 6, wherein the light source group located in the first end section and the light source group located in the second end section configure the end side light source group and are configured to be driven to have substantially equal brightness.

8. The lighting device according to claim 6, wherein the light source drive controller is configured to control light of one of the end side light source group and the middle light source group.

9. The lighting device according to claim 1, wherein the light source drive controller is configured to control light of the light source groups arranged parallel to each other in the column direction such that brightness increases from the middle portion toward the end of the bottom part in the column direction.

10. The lighting device according to claim 9, wherein the light source drive controller is configured to control light of the light source groups arranged parallel to each other in the column direction such that brightness increases from the middle portion toward each end of the bottom part in the column direction.

11. The lighting device according to claim 10, wherein the light source drive controller is configured to control light of the light source groups arranged parallel to each other in the column direction such that brightness distribution is symmetrical with a line passing through a center of the bottom part and extending along the row direction.

12. The lighting device according to claim 11, wherein the light source drive controller is configured to control light of the light source groups arranged parallel to each other in the column direction such that brightness increases proportionally as a distance from the center of the bottom part in the column direction increases.

13. The lighting device according to claim 1, further comprising:
a light source board arranged along the bottom part and having the light sources being mounted thereon; and
a wiring pattern formed on the light source board and configured to connect in series the plurality of light sources of the light source groups.

14. The lighting device according to claim 13, wherein the light source board has an elongated shape extending along the row direction, and the light source board includes a plurality of light source boards that are arranged parallel to each other in the column direction on the bottom part and spaced apart from each other.

15. The lighting device according to claim 13, further comprising a connecting component, wherein:
the light source board includes a plurality of light source boards that are arranged in the row direction on the bottom part;
the connecting component is configured to electrically connect the light source boards that are arranged in the row direction.

16. The lighting device according to claim 1, wherein the light source groups adjacent to each other in the column direction are substantially equally spaced apart from each other.

17. The lighting device according to claim 1, wherein the light source groups adjacent to each other in the column direction are spaced closer to each other in the middle portion than at ends of the bottom part in the column direction.

18. The lighting device according to claim 1, wherein:
the light source drive controller includes a light control unit and a light source driver:
the light control unit is configured to output control signals for driving the end side light source group and the middle light source group to have respective predetermined brightness levels; and
the light source driver is configured to supply drive voltage to each of the end side light source group and the middle light source group based on the control signals output from the light control unit.

19. The lighting device according to claim 18, wherein the light control unit generates pulse signals as control signals, and the light source driver is configured to drive the end side light source group and the middle light source group based on the pulse signals such that each of the end side light source group and the middle light source group has a different time period ratio of an ON time and an OFF time.

20. The lighting device according to claim 1, wherein the light sources are LEDs.

21. The lighting device according to claim 1, further comprising diffuser lenses arranged on a light exit side of the light sources and configured to diffuse light from the light sources.

22. The display device according to claim 1, wherein the display panel is a liquid crystal panel defined by a pair of substrates with liquid crystal sealed therebetween.

23. The display device according to claim 1, wherein, in the second image display mode, the light source drive controller controls light such that the middle light source group has substantially equal brightness as the end side light source group that is in the first image display mode.

24. A television receiver comprising the display device according to claim 1.

25. A display device comprising:
  a lighting device including:
    a plurality of light sources;
    a chassis including a bottom part having a rectangular plan view shape and configured to house the light sources; and
    a light source drive controller configured to control drive of the light sources; and
  a display panel configured to display images using light from the lighting device, wherein
  the light sources are arranged in a matrix in row and column directions along the bottom part;
  the light sources that are arranged in the row direction configure a light source group and the light source group includes a plurality of light source groups arranged in the column direction;
  the light source groups include a middle light source group and an end side light source group and the middle light source group includes the light source groups arranged in a middle portion of the bottom part in the column direction and the end side light source group includes the light source groups arranged close to an end side of the bottom part in the column direction;
  the light source drive controller is configured to control light of at least one of the middle light source group and the end side light source group in accordance with an image display mode;
  the image display mode includes a first image display mode having brightness uniformity and a second image display mode having higher brightness than that of the first image display mode;
  in the first image display mode, the light source drive controller is configured to control light of at least one of the middle light source group and the end side light source group such that the end side light source group has relatively high brightness and the middle light source group has relatively low brightness;
  in the first image display mode, the light source drive controller is configured to control the middle light source group such that an ON time is shorter and an OFF time is longer than the ON time and the OFF time of the middle light source group in the second image display mode; and
  in the second image display mode, the light source drive controller is configured to control light of at least one of the middle light source group and the end side light source group such that the end side light source group and the middle light source group have equal brightness.

26. A display device comprising:
  a lighting device comprising:
    a plurality of light sources;
    a chassis including a bottom part having a rectangular plan view shape and configured to house the light sources; and
    a light source drive controller configured to control drive of the light sources;
  a display panel configured to display images using light from the lighting device,
  wherein:
    the light sources are arranged in a matrix in row and column directions along the bottom part;
    the light sources that are arranged in the row direction configure a light source group and the light source group includes a plurality of light source groups arranged in the column direction;
    the light source groups include a middle light source group and an end side light source group and the middle light source group includes the light source groups arranged in a middle portion of the bottom part in the column direction and the end side light source group includes the light source groups arranged close to an end side of the bottom part in the column direction;
    the light source drive controller is configured to control light of at least one of the middle light source group and the end side light source group in accordance with an image display mode;
    the image display mode includes a first image display mode having brightness uniformity and a second image display mode having higher brightness than that of the first image display mode;
    in the first image display mode, the light source drive controller is configured to control the middle light source group such that the end side light source group has relatively high brightness and the middle light source group has relatively low brightness;
    in the second image display mode, the light source drive controller is configured to control the middle light source group such that the end side light source group and the middle light source group have equal brightness; and
    in the first image display mode, the light source drive controller is configured to control light of the middle light source group such that an ON time is shorter and an OFF time is longer than the ON time and the OFF time of the middle light source group in the second image display mode.

* * * * *